US012782154B2

(12) United States Patent
Zhang

(10) Patent No.: US 12,782,154 B2
(45) Date of Patent: Nov. 3, 2026

(54) VEHICLE NAVIGATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Honglong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 18/816,914

(22) Filed: Aug. 27, 2024

(65) Prior Publication Data

US 2024/0418524 A1 Dec. 19, 2024

Related U.S. Application Data

(63) Continuation of application No. PCT/CN2023/084028, filed on Mar. 27, 2023.

(30) Foreign Application Priority Data

May 5, 2022 (CN) ......................... 202210478168.8

(51) Int. Cl.
*G01C 21/36* (2006.01)
*B60W 50/14* (2020.01)

(52) U.S. Cl.
CPC ......... *G01C 21/3638* (2013.01); *B60W 50/14* (2013.01); *B60W 2050/146* (2013.01); *B60W 2554/402* (2020.02); *B60W 2554/80* (2020.02)

(58) Field of Classification Search
CPC ........... G01C 21/3638; G01C 21/3635; B60W 50/14; B60W 2050/146; B60W 2554/402; B60W 2554/80
See application file for complete search history.

(56) References Cited

U.S. PATENT DOCUMENTS 5,475,494 A 12/1995 Nishida et al.
11,273,847 B2 * 3/2022 Tsuda ................ B60W 60/0059
(Continued)

FOREIGN PATENT DOCUMENTS

CN 106004659 A 10/2016
CN 107466357 A 12/2017
(Continued)

OTHER PUBLICATIONS

The World Intellectual Property Organization (WIPO) International Search Report for PCT/CN2023/084028 Jul. 5, 2023 8 Pages (including translation).
(Continued)

*Primary Examiner* — Mary Cheung
(74) *Attorney, Agent, or Firm* — ANOVA LAW GROUP, PLLC

(57) ABSTRACT

Embodiments of this application provide a vehicle navigation method, which can be used in a vehicle navigation scenario in a self-driving field or an active driving field. The vehicle navigation method includes displaying a navigation interface including a virtual map, the virtual map presenting a road scene, and the navigation interface comprising a vehicle identification object identifying the current vehicle, a warning sign display region for displaying a warning sign being set around the vehicle identification object, when the environment in which the current vehicle is located comprises an obstacle, the navigation interface further comprising an obstacle identification object identifying the obstacle; setting a display attribute of the warning sign display region when the obstacle enters an early warning region, to display a warning sign about the obstacle; and causing a vehicle navigation system to control a travel status of the current vehicle according to the warning sign.

18 Claims, 24 Drawing Sheets

(56) References Cited

U.S. PATENT DOCUMENTS

| | | | | |
|---|---|---|---|---|
| 12,055,942 | B1 * | 8/2024 | Gogna .................. | G05D 1/628 |
| 2007/0219720 | A1 | 9/2007 | Trepagnier et al. | |
| 2017/0277195 | A1 * | 9/2017 | Frazzoli ............ | B60W 60/0015 |
| 2018/0257647 | A1 * | 9/2018 | Jurca ................. | B60W 30/0956 |
| 2019/0311613 | A1 | 10/2019 | Johnson et al. | |
| 2021/0387615 | A1 * | 12/2021 | Aoki .................. | B60W 30/095 |

FOREIGN PATENT DOCUMENTS

| | | | | | |
|---|---|---|---|---|---|
| CN | 110171362 | A | | 8/2019 | |
| CN | 110539638 | A | | 12/2019 | |
| CN | 111751824 | A | | 10/2020 | |
| CN | 112224132 | A | | 1/2021 | |
| CN | 112519797 | A | | 3/2021 | |
| CN | 112558072 | A | | 3/2021 | |
| CN | 112562414 | A | | 3/2021 | |
| CN | 113268057 | A | | 8/2021 | |
| CN | 113734048 | A | * | 12/2021 | ............... B60R 1/00 |
| CN | 114255606 | B | * | 9/2023 | ........... G08G 1/0968 |
| EP | 4030406 | B1 | * | 9/2024 | ............ G08G 1/166 |
| JP | 2005227947 | A | * | 8/2005 | |
| JP | 2010235072 | A | | 10/2010 | |
| JP | 2018116628 | A | * | 7/2018 | |
| WO | 2020082776 | A1 | | 4/2020 | |
| WO | 2021134441 | A1 | | 7/2021 | |

OTHER PUBLICATIONS

The State Intellectual Property Office of the People's Republic of China (SIPO) Office Action 1 for 202210478168.8 Jun. 13, 2022 19 Pages (including translation).

* cited by examiner

VEHICLE NAVIGATION METHOD AND APPARATUS, COMPUTER DEVICE, AND STORAGE MEDIUM

RELATED APPLICATIONS

This application is a continuation of PCT Application No. PCT/CN2023/084028, filed on Mar. 27, 2023, which in turn claims priority to Chinese Patent Application No. 202210478168.8, entitled "VEHICLE NAVIGATION METHOD AND APPARATUS, COMPUTER DEVICE, AND STORAGE MEDIUM" filed on May 5, 2022, which are incorporated herein by reference in their entirety.

FIELD OF THE TECHNOLOGY

This application relates to the field of computer technologies, and in particular, to a vehicle navigation method and apparatus, a computer device, and a storage medium.

BACKGROUND OF THE DISCLOSURE

With the rapid development of computer technologies, a vehicle navigation technology has been widely used in daily life. The vehicle navigation technology is a technology of mapping, based on positioning data provided by a satellite positioning system, a real-time position relationship between a vehicle and a road into a visualized navigation interface, to provide a navigation function for a user of the vehicle (for example, a driver or a passenger) in a process of the vehicle traveling from a start point to an end point.

Currently, during vehicle navigation, a visualized navigation interface is presented to a user of the vehicle (for example, a driver or a passenger). Through the navigation interface, the user of the vehicle can learn information such as a current position of the vehicle, a traveling route of the vehicle, a speed of the vehicle, a road condition ahead, and the like.

SUMMARY

Embodiments of this application provide a vehicle navigation method and apparatus, a computer device, and a storage medium, which can focus on an obstacle in an environment in which a vehicle is located during vehicle navigation, improving an effect of vehicle navigation, thereby improving safety during vehicle traveling.

An embodiment of this application provides a vehicle navigation method. The vehicle navigation method includes: displaying a navigation interface, the navigation interface comprising a virtual map, the virtual map presenting a road scene of an environment in which a current vehicle is located, and the navigation interface comprising a vehicle identification object identifying the current vehicle, a warning sign display region for displaying a warning sign being set around the vehicle identification object, when the environment in which the current vehicle is located comprises an obstacle, the navigation interface further comprising an obstacle identification object identifying the obstacle; setting a display attribute of the warning sign display region when the obstacle enters an early warning region of the current vehicle, to display a warning sign about the obstacle in the navigation interface; and causing a vehicle navigation system of the current vehicle to control a travel status of the current vehicle according to the warning sign, the warning sign indicating at least one of the following: that a distance between the current vehicle and the obstacle is less than or equal to an early warning distance corresponding to the early warning region, or a directional relationship between the current vehicle and the obstacle.

An embodiment of this application further provides a computer device. The computer device includes a processor and a computer-readable storage medium.

The processor is configured to implement a computer program. The computer-readable storage medium has a computer program stored therein. The computer program is configured for being loaded by the processor and performing the vehicle navigation method.

An embodiment of this application further provides a non-transitory computer-readable storage medium. The computer-readable storage medium has a computer program stored therein. The computer program, when read and executed by a processor of a computer device, causes the computer device to perform the vehicle navigation method.

DESCRIPTION OF EMBODIMENTS

Figure 1:
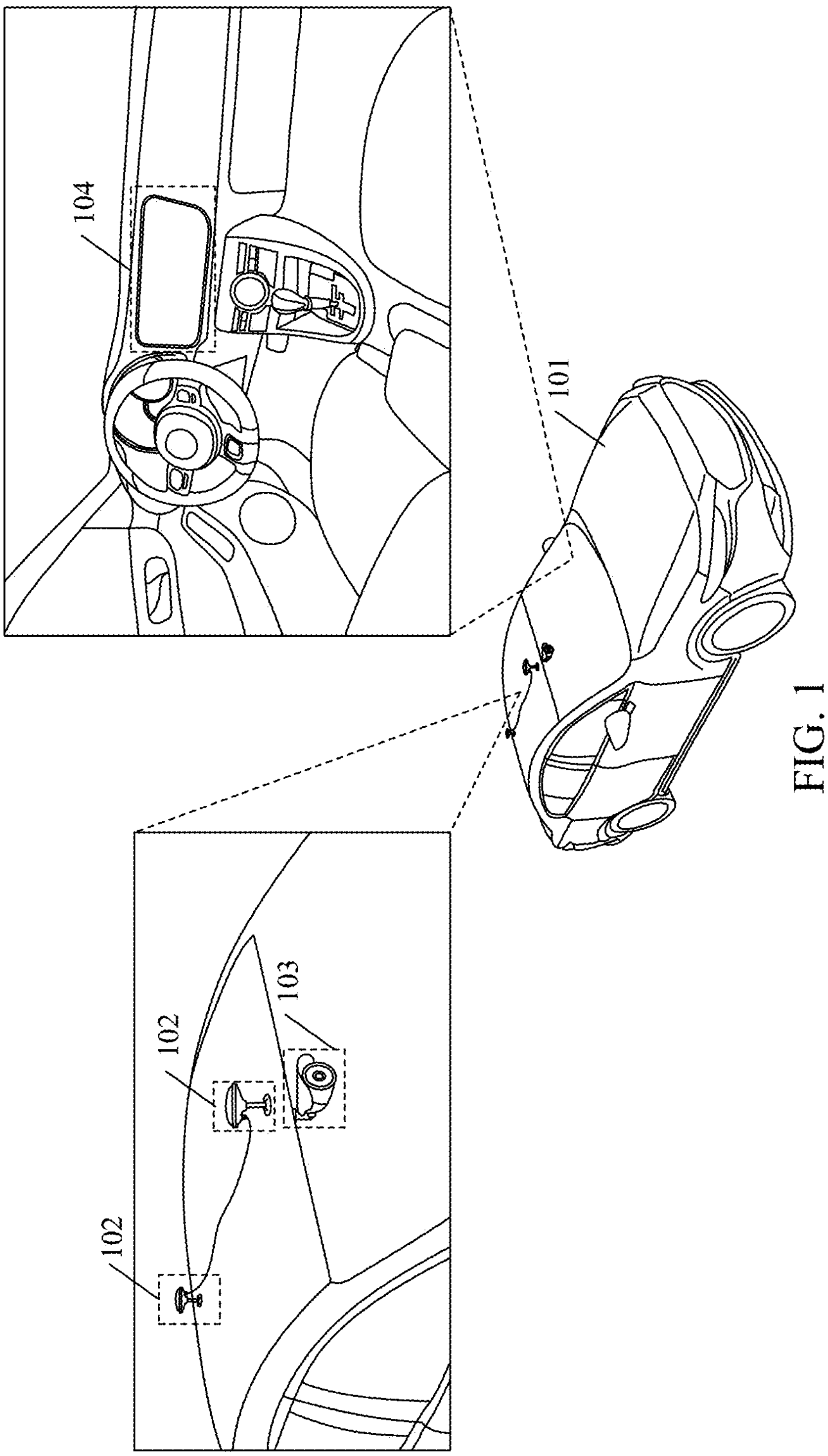
FIG. 1 is a schematic architecture diagram of a vehicle navigation system according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

This application relates to vehicle navigation technologies in an intelligent traffic system. The intelligent traffic system (ITS), also referred to as an intelligent transportation system, is a comprehensive transportation system that ensures safety, improves efficiency, improves the environment, and saves energy, formed by effectively and comprehensively applying advanced science and technology (such as information technology, computer technology, data communication technology, sensor technology, electronic control technology, automatic control theory, operations research, and artificial intelligence) in transportation, service control, and vehicle manufacturing, to strengthen connection between vehicles, roads, and users.

A current vehicle navigation technology focuses on a vehicle that is being driven (to be specific, a vehicle in which an intelligent vehicle terminal is located, or a vehicle that a user of the vehicle is currently driving or riding). The vehicle navigation technology only focusing on the vehicle that is being driven has a poor navigation effect. Based on this, an embodiment of this application provides a vehicle navigation method. The vehicle navigation method pays attention to both the vehicle that is being driven (namely, the vehicle in which the intelligent vehicle terminal is located, or the vehicle that the user of the vehicle is currently driving or riding), and an obstacle in an environment in which the vehicle is located, and focuses on any one or more of a distance between the vehicle that is being driven and the obstacle or a direction between the vehicle and the obstacle. Specifically, some embodiments can provide a visualized navigation interface to the vehicle-associated user during vehicle traveling. A vehicle identification object for identifying the vehicle that is being driven may be displayed in the navigation interface. When the environment of the vehicle that is being driven includes an obstacle, an obstacle identification object for identifying the obstacle may also be displayed in the navigation interface. A warning sign display region is set around the obstacle identification object. In addition, when the obstacle enters an early warning region of the vehicle that is being driven, a warning sign about the obstacle is displayed in the navigation interface through setting of a display attribute of the warning sign display region. The warning sign may be configured for indicating any one or more of that a distance between the vehicle that is being driven and the obstacle is less than or equal to a distance corresponding to the early warning region, or a directional relationship between the vehicle that is being driven and the obstacle. In addition, at least one of the following may be presented in the navigation interface: vehicle travel status information (for example, current speed information of the vehicle, departure position (namely, start position) information of the vehicle, destination position (namely, end position) information of the vehicle, and information about a remaining distance to an end point and about a remaining time to an end point), traffic information (for example, traffic light information, vehicle speed limit information, and vehicle traffic restriction information), or navigation information (for example, navigation information indicating going straight into XX road, indicating turning left into XX road, indicating turning right into XX road, or indicating turning around). The obstacle means other objects than the vehicle that is being driven in the environment in which the vehicle is located, such as vehicles other than the vehicle that is being driven in the environment in which the vehicle that is being driven is located, pedestrians in the environment in which the vehicle that is being driven is located, and traffic facilities (for example, traffic signs, median barriers, median columns, and anti-collision buckets) in the environment in which the vehicle that is being driven is located. The vehicle identification object of the vehicle that is being driven is an object configured for identifying the vehicle that is being driven in the navigation interface. The obstacle identification object for identifying the obstacle is an object configured for identifying the obstacle in the navigation interface. Obstacle identification objects of different obstacle types may be the same or different.

The vehicle navigation method provided in the embodiments of this application may be applied to a vehicle navigation process in a self-driving scenario. The self-driving scenario is a vehicle driving scenario, which means a scenario in which a vehicle is controlled by a vehicle self-driving system to travel. In the vehicle navigation process in the self-driving scenario, through presenting of a visualized navigation interface to a user of the vehicle (to be specific, a passenger), the user of the vehicle can clearly and intuitively understand a relationship between a vehicle that is being driven and an obstacle in an environment in which the vehicle that is being driven is located, and a capability and a status of the self-driving system. Accordingly, a sense of security of the user of the vehicle in the self-driving scenario can be improved. In addition, the self-driving system, for example, the intelligent vehicle terminal, may control the travel status of the vehicle based on a warning sign, for example, control a travel speed and a travel direction of the vehicle. The vehicle navigation system provided in the embodiments of this application may also be used in a vehicle navigation process of an active driving system. An active driving scenario, in other words, a human driving scenario, is a scenario in which a vehicle is controlled by a human driver to travel. In the vehicle navigation process in the active driving scenario, through presenting of a visualized navigation interface to user of the vehicles (to be specific, a driver or a passenger), the user of the vehicles can clearly and intuitively understand a relationship between a vehicle that is being driven and an obstacle in an environment in which the vehicle is located and a travel status of the vehicle. The driver can perform driving planning based on the relationship between the vehicle that is being driven and the obstacle. Accordingly, safety during vehicle traveling can be improved. In addition, a sense of security of the passenger during riding can be improved.

The vehicle navigation system provided in the embodiments of this application is described below with reference to the accompanying drawings. As shown in FIG. 1, a vehicle navigation system may include a target vehicle 101, a positioning device 102, a sensing device 103, and an intelligent vehicle terminal 104. The positioning device 102, the sensing device 103, and the intelligent vehicle terminal 104 are installed in the target vehicle 101.

(1) Positioning device 102. The positioning device may be configured to obtain position data (namely, absolute position data of the vehicle that is being driven) of a target vehicle (namely, the vehicle that is being driven) in a world coordinate system. The world coordinate system is an absolute coordinate system of a system. The positioning device may send the position data of the target vehicle in the world coordinate system to the intelligent vehicle terminal. The positioning device related in some embodiments may be a real time kinematic (RTK) device. The RTK device can provide positioning data (namely, the absolute position data of the target vehicle) of the target vehicle in high precision (for example, in a centimeter level) in real time.

Figure 2:
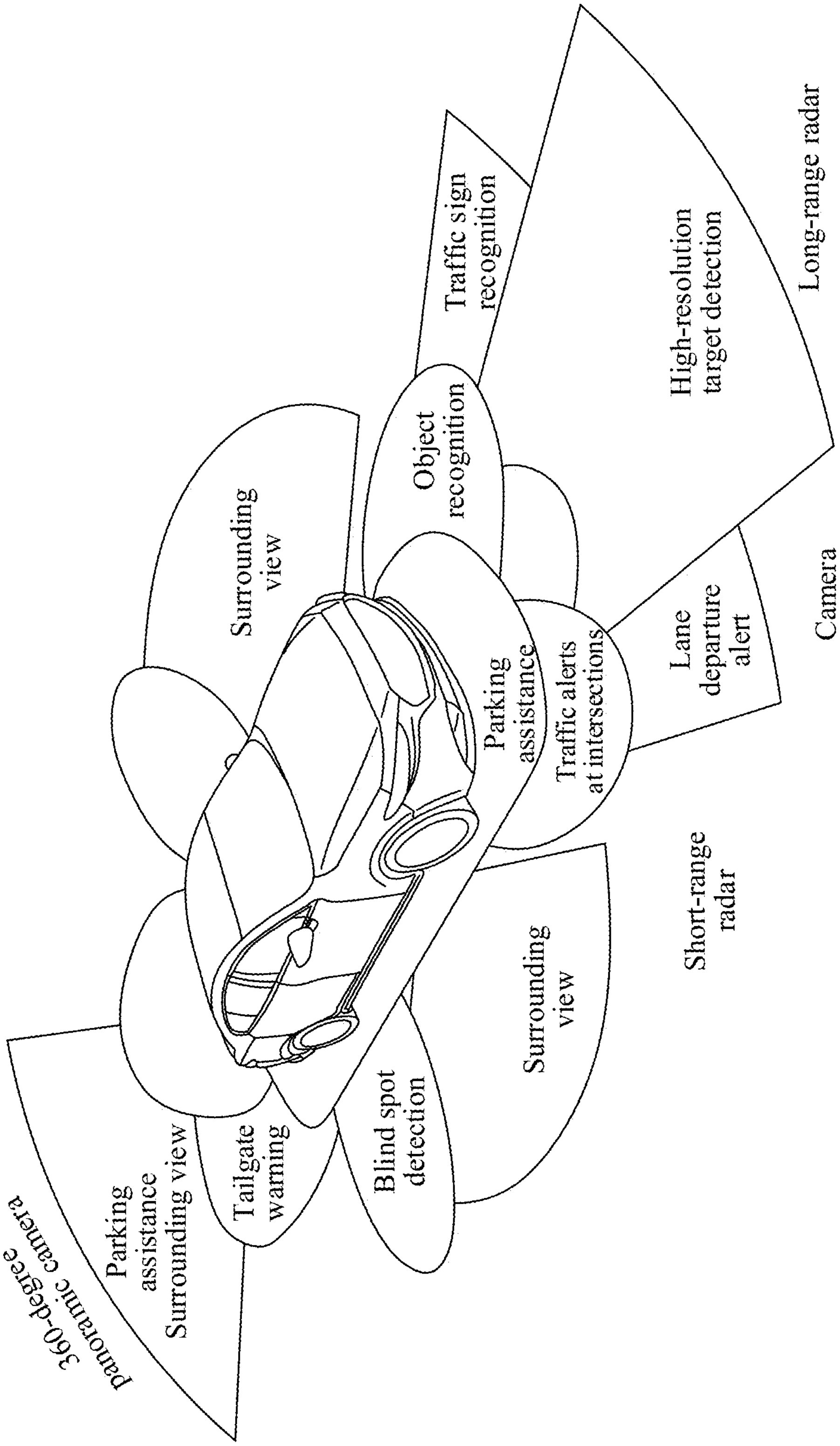
FIG. 2 is a schematic diagram of a layout of a sensing device according to an embodiment of this application.

(2) Sensing device 103. The sensing device may be configured to sense an environment in which the target vehicle is located, to obtain environment sensing data. The environment sensing data may include position data (namely, relative coordinate data) of an obstacle in a vehicle coordinate system and an obstacle type of the obstacle. The vehicle coordinate system is a coordinate system established using the target vehicle as a coordinate origin. The sensing device may send the environment sensing data to the intelligent vehicle terminal. The sensing range of the sensing device performing sensing on the environment in which the target vehicle is located is determined by a sensor integrated in the sensing device. Generally, the sensing device may include, but is not limited to, at least one sensor of the following: a visual sensor (for example, a camera), a long-range radar, or a short-range radar. A detection distance supported by the long-range radar is longer than a detection distance supported by the short-range radar. FIG. 2 is a schematic diagram of a layout of a sensing device. The sensing device includes a camera, a 360-degree panoramic camera, a long-range radar, and a short-range radar. The sensing range of the sensing device as shown in FIG. 2 includes approximately 200 meters forward, 100 meters backward, and 80 meters leftward and rightward.

(3) Intelligent vehicle terminal 104. The intelligent vehicle terminal is a terminal device that integrates satellite positioning technology, mileage positioning technology, and vehicle black box technology, and may be configured to perform vehicle traveling safety management, operation management, service quality management, intelligent centralized dispatching management, electronic stop board control management, and the like on vehicles. The intelligent vehicle terminal may include a display screen, such as a central control screen, an instrument screen, and an augmented reality head-up display (AR-HUD) display screen. After receiving the absolute position data and the environment sensing data of the target vehicle, the intelligent vehicle terminal can transform the position data of the obstacle in the vehicle coordinate system into position data of the obstacle in the world coordinate system, that is, transform relative position data of the obstacle into absolute position data of the obstacle. Then the intelligent vehicle terminal can display, according to the absolute position data of the obstacle, an obstacle identification object for identifying the obstacle in the navigation interface displayed in the display screen. In addition, when the obstacle enters an early warning region of the target vehicle, the intelligent vehicle terminal may determine a direction between the target vehicle and the obstacle and a distance between the target vehicle and the obstacle according to the absolute position data of the target vehicle and the absolute position data of the obstacle. Then, a warning sign about the obstacle may be displayed in the navigation interface according to any one or more of the directions between the target vehicle and the obstacle or the distance between the target vehicle and the obstacle.

Figure 3:
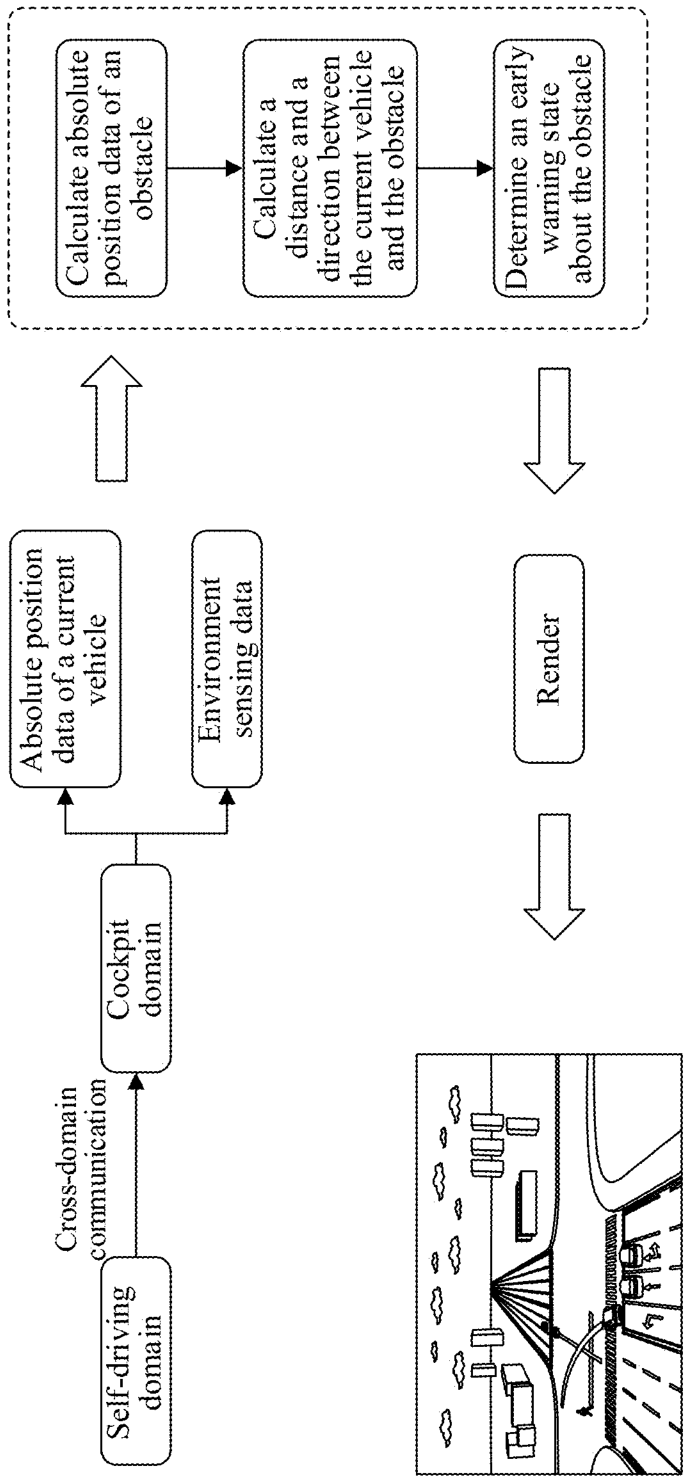
FIG. 3 is a schematic flowchart of a type of cross-domain communication according to an embodiment of this application.
Figure 4:
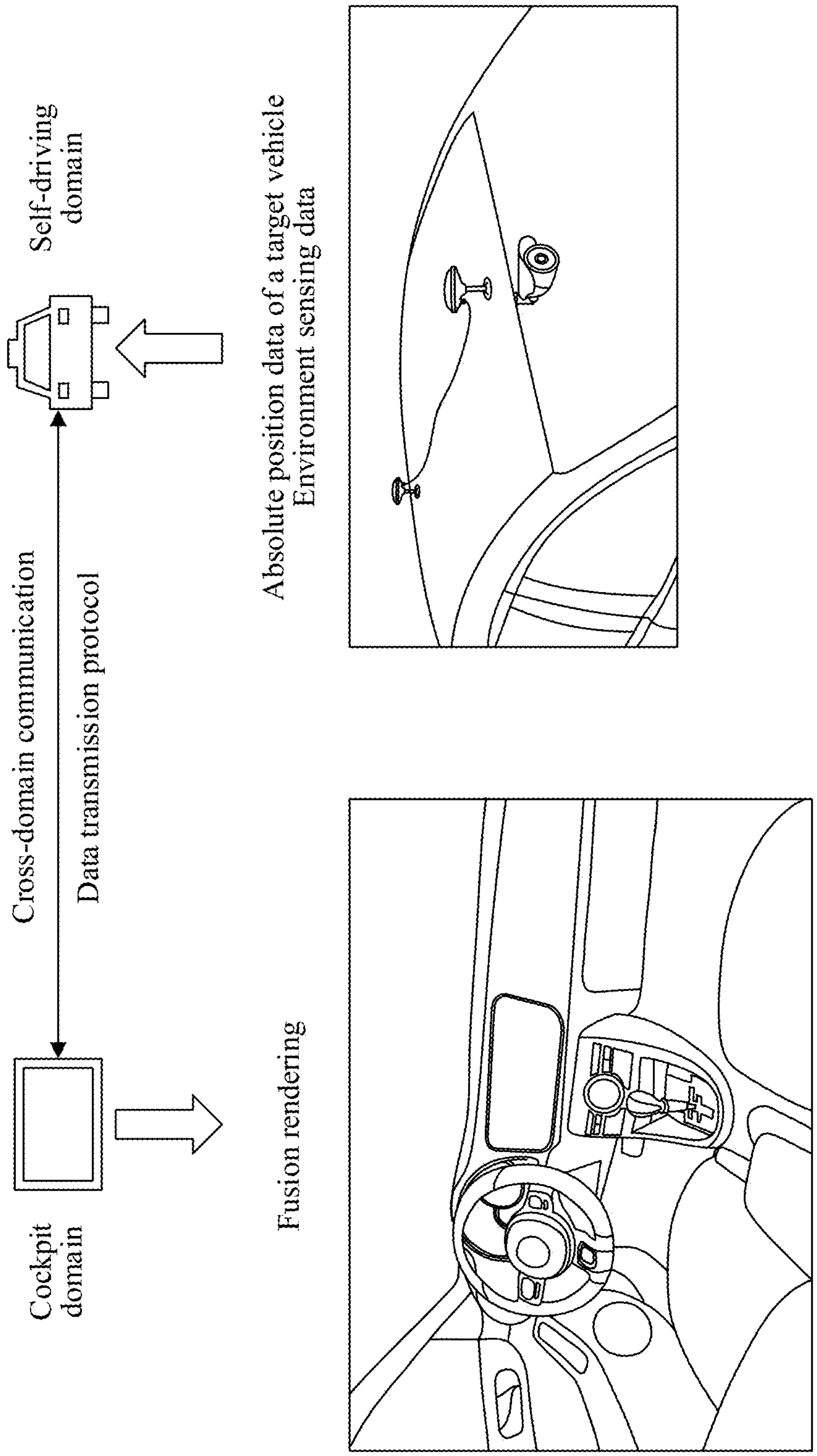
FIG. 4 is a schematic flowchart of another type of cross-domain communication according to an embodiment of this application.

Using the self-driving scenario as an example, the vehicle navigation method provided in the embodiments of this application involves cross-domain communication between a self-driving domain and a cockpit domain. The self-driving domain is a set of software and hardware configured to control self-driving of the vehicle. For example, both the positioning device 102 and the sensing device 103 belong to the self-driving domain. The cockpit domain is a set of software and hardware that are configured to control a central control screen, an instrument screen, operating buttons, and the like that interact with the user of the vehicle in a cockpit in the vehicle. For example, the intelligent vehicle terminal 104 belongs to the cockpit domain. The cockpit domain and the self-driving domain are two relatively independent processing systems. The two processing systems perform cross-domain data transmission through a data transmission protocol based on vehicle Ethernet. The vehicle Ethernet is a new local area network technology that relies on a network to connect in-vehicle electronic units. A relatively high data transmission rate (for example, 100 megabits per second (Mbit/s), 1,000 Mbit/s, or 10,000 Mbit/s) can be realized on a single unshielded twisted pair. In addition, requirements of high reliability, low electromagnetic radiation, low power consumption, low delay, and the like that are required in the automotive industry are satisfied. The data transmission protocol may be, for example, Transmission Control Protocol (TCP), User Datagram Protocol (UDP), Scalable Service-Oriented Middleware over IP (SOME/IP, a data transmission protocol), or the like. The data transmission protocol specifies a data transmission format between the self-driving domain and the cockpit domain. As shown in FIG. 3 and FIG. 4, after obtaining the absolute position data of the target vehicle and the environment sensing data, the self-driving domain transmits the absolute position data of the target vehicle and the environment sensing data to the cockpit domain through cross-domain communication. The cockpit domain may calculate the absolute position data of the obstacle according to the absolute position data of the target vehicle and the environment sensing data. When the obstacle enters the early warning region of the target vehicle, the direction between the target vehicle and the obstacle and the distance between the target vehicle and the obstacle may be determined according to the absolute position data of the target vehicle and the absolute position data of the obstacle. Then, the cockpit domain may render the obstacle identification object of the obstacle in the navigation interface according to the absolute position data of the obstacle, and may render the warning sign about the obstacle in the navigation interface according to any one or more of the direction between the target vehicle and the obstacle and the distance between the target vehicle and the obstacle.

Through the vehicle navigation system including the target vehicle, the location device, the sensing device, and the vehicle terminal, the obstacle identification object for identifying the obstacle in the environment in which the target vehicle is located, and the warning sign about the obstacle can be displayed in the navigation interface. Accordingly, display content of the navigation interface can be enriched, the effect of vehicle navigation can be improved, and safety during vehicle traveling can further be improved. The vehicle navigation system described in the embodiments of this application is intended to describe the technical solutions in the embodiments of this application more clearly, and does not constitute a limitation on the technical solutions provided in the embodiments of this application. A person of ordinary skill in the art may learn that, with the evolution of system architectures and the emergence of new service scenarios, the technical solutions provided in the embodiments of this application are also applicable to similar technical problems.

The vehicle navigation method provided in the embodiments of this application is described below in more detail with reference to the accompanying drawings.

Figure 5A:
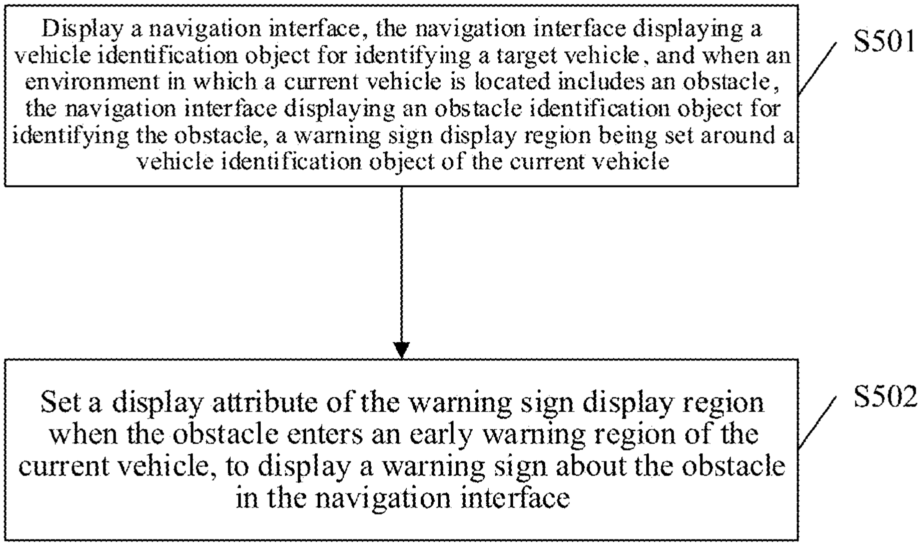
FIG. 5A and FIG. 5B are schematic flowcharts of a vehicle navigation method according to an embodiment of this application.

An embodiment of this application provides a vehicle navigation method. The vehicle navigation method mainly describes content of transforming the relative position data of the obstacle into the absolute position data of the obstacle. The vehicle navigation method may be performed by the intelligent vehicle terminal 104 in the vehicle navigation system. Referring to FIG. 5A, the vehicle navigation method may include the following operation S501 and operation S502:

S501. Display a navigation interface, the navigation interface displaying a vehicle identification object for identifying a target vehicle, and when an environment in which a current vehicle is located includes an obstacle, the navigation interface displaying an obstacle identification object for identifying the obstacle, a warning sign display region being set around a vehicle identification object of the current vehicle.

During traveling of the current vehicle, the navigation interface may be displayed. The navigation interface may include a virtual map. The virtual map may be drawn according to map data of the environment in which the current vehicle is located. The virtual map may be configured for presenting a road scene of the environment in which the current vehicle is located. In other words, the virtual map may be virtual mapping of the road scene of the environment in which the current vehicle is located. For example, a real road includes three lanes, and a mapped road of the real road in the virtual map also includes three lanes. A guiding arrow of each lane in the mapped road is completely consistent with a guiding arrow of a corresponding lane in the real road. In one embodiment, the virtual map may present the road scene in a three-dimensional form. In other words, the virtual map is a virtual road scene obtained through three-dimensional modeling of the road scene of the environment in which the current vehicle is located. In this case, each road in the environment in which the current vehicle is located has corresponding height data (or may be referred to as elevation data). This is particularly applicable to a road scene in which a plurality of roads of different heights overlaps or an overhead bridge is intricate. In another embodiment, the virtual map may present the road scene in a two-dimensional form. In other words, the virtual map is a two-dimensional virtual mapping of a top view of the road scene of the environment in which the current vehicle is located. In this case, each road in the environment in which the current vehicle is located does not have height data. This is particularly applicable to a road scene in which a road network is simple.

Figure 5B:
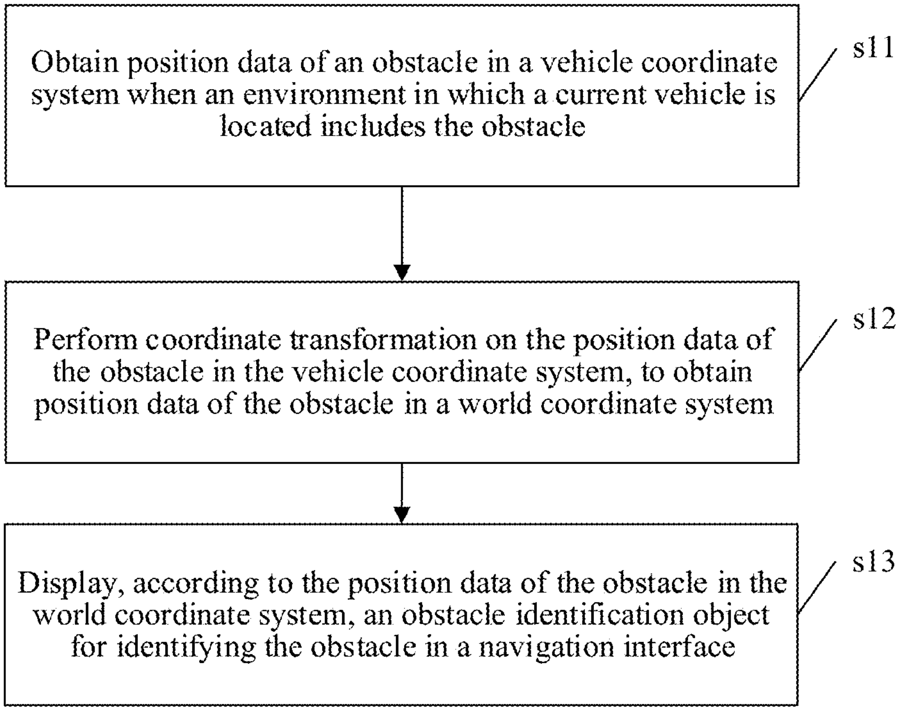

The navigation interface further includes the vehicle identification object of the current vehicle. The vehicle identification object of the current vehicle may be displayed in the navigation interface according to position data of the current vehicle in a world coordinate system. When the environment in which the current vehicle is located includes the obstacle, the navigation interface may display the obstacle identification object for identifying the obstacle. The navigation interface may be displayed based on the world coordinate system, and the obstacle identification object for identifying the obstacle may be displayed in the navigation interface according to position data of the obstacle in the world coordinate system. Specifically, a process of displaying the obstacle identification object for identifying the obstacle in the navigation interface is shown in FIG. 5B, and may include the following sub-operation s11 to sub-operation s13.

s11. Obtain position data of the obstacle in a vehicle coordinate system when the environment in which the current vehicle is located includes the obstacle.

Figure 6:
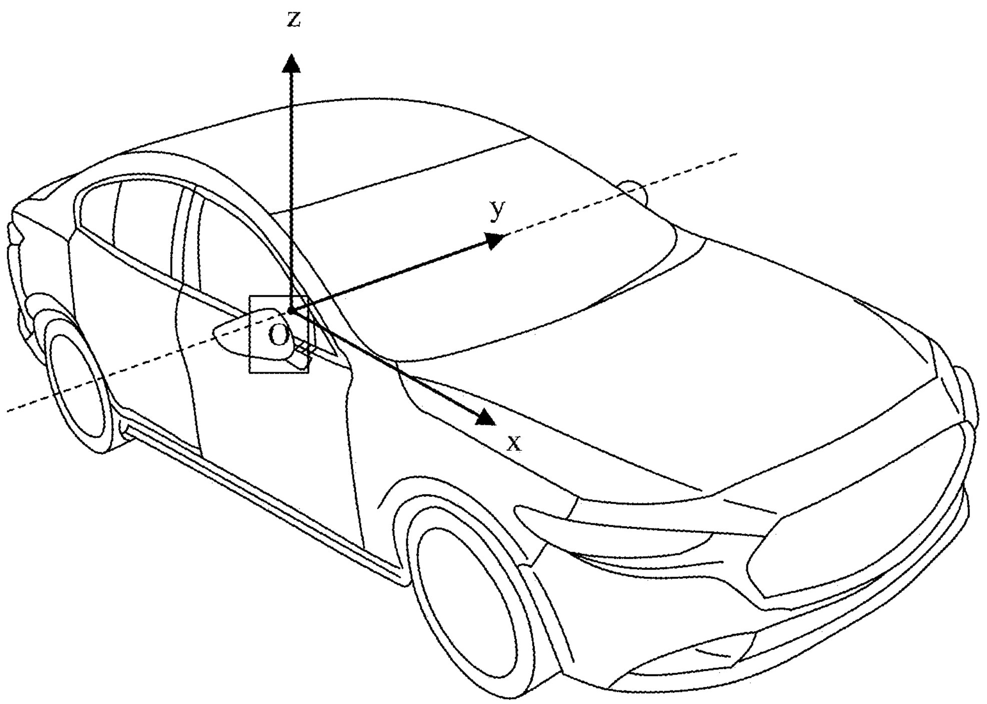
FIG. 6 is a schematic diagram of a vehicle coordinate system according to an embodiment of this application.

When the environment in which the current vehicle is located includes the obstacle, the position data of the obstacle in a vehicle coordinate system may be obtained. The vehicle coordinate system may be a coordinate system established using the current vehicle as a coordinate origin. More specifically, as shown in FIG. 6, the vehicle coordinate system may be a coordinate system established using a center of rear axle shafts of the current vehicle (that is, a center point of a connection line between axle shafts of two rear wheels of the current vehicle) as the coordinate origin (O), using a travel direction of the current vehicle as a horizontal axis (namely, an x-axis), using a left direction of the current vehicle as a longitudinal axis (namely, a y-axis), and using an upward direction perpendicular to an O-xy plane as a vertical axis (namely, a z-axis). Alternatively, the vehicle coordinate system may be a coordinate system established using a center of the current vehicle (namely, a center point of a symmetrical axis of the current vehicle) as a coordinate origin, using a travel direction of the current vehicle as a longitudinal axis (namely, a y-axis), using a right direction of the current vehicle as a horizontal axis (namely, an x-axis), and using an upward direction perpendicular to an O-xy plane as a vertical axis (namely, a z-axis). A method of establishing the vehicle coordinate system is not limited in some embodiments.

s12. Perform coordinate transformation on the position data of the obstacle in the vehicle coordinate system, to obtain position data of the obstacle in the world coordinate system.

The coordinate transformation performed on the position data of the obstacle in the vehicle coordinate system may be performed according to the position data of the current vehicle in the world coordinate system. To be specific, the position data of the current vehicle in the world coordinate system may be obtained, and the coordinate transformation is performed on the position data of the obstacle in the vehicle coordinate system according to the position data of the current vehicle in the world coordinate system, to obtain the position data of the obstacle in the world coordinate system.

Specifically, a process of performing the coordinate transformation on the position data of the obstacle in the vehicle coordinate system according to the position data of the current vehicle in the world coordinate system, to obtain the position data of the obstacle in the world coordinate system may include: obtaining a transformation relationship between the world coordinate system and the vehicle coordinate system, performing calculation on the position data of the obstacle in the vehicle coordinate system based on the transformation relationship, to obtain a position variation of the obstacle relative to the current vehicle in the world coordinate system, and determining the position data of the obstacle in the world coordinate system according to the position data of the current vehicle in the world coordinate system and the position variation.

The position data of the current vehicle in the world coordinate system may include coordinate data of the current vehicle in the world coordinate system. The coordinate data of the current vehicle in the world coordinate system may include: longitudinal data of the current vehicle and latitudinal data of the current vehicle. The position data of the obstacle in the vehicle coordinate system may include coordinate data of the obstacle in the vehicle coordinate system. The coordinate data of the obstacle in the vehicle coordinate system may include: horizontal axis data of the obstacle and longitudinal axis data of the obstacle. The position data of the obstacle in the world coordinate system may include coordinate data of the obstacle in the world coordinate system. The coordinate data of the obstacle in the world coordinate system may include: longitudinal data of the obstacle and latitudinal data of the obstacle.

For the longitudinal data of the obstacle, a process of transforming the horizontal axis data of the obstacle into the longitudinal data of the obstacle may include: obtaining a longitudinal transformation relationship between the world coordinate system and the vehicle coordinate system, performing calculation on the latitudinal data of the current vehicle and the horizontal axis data of the obstacle based on the longitudinal transformation relationship, to obtain a longitudinal variation of the obstacle relative to the current vehicle in the world coordinate system, and determining the longitudinal data of the obstacle according to the longitudinal data of the current vehicle and the longitudinal variation. For the latitudinal data, a process of transforming the longitudinal axis data of the obstacle into the latitudinal data of the obstacle may include: obtaining a latitudinal transformation relationship between the world coordinate system and the vehicle coordinate system, performing calculation on the longitudinal axis data of the obstacle based on the latitudinal transformation relationship, to obtain a latitudinal variation of the obstacle relative to the current vehicle in the world coordinate system, and determining the latitudinal data of the obstacle according to the latitudinal data of the current vehicle and the latitudinal variation.

For ease of understanding, a coordinate transformation process is described below in more detail with reference to specific schematic diagrams and formulas.

Figure 7A:
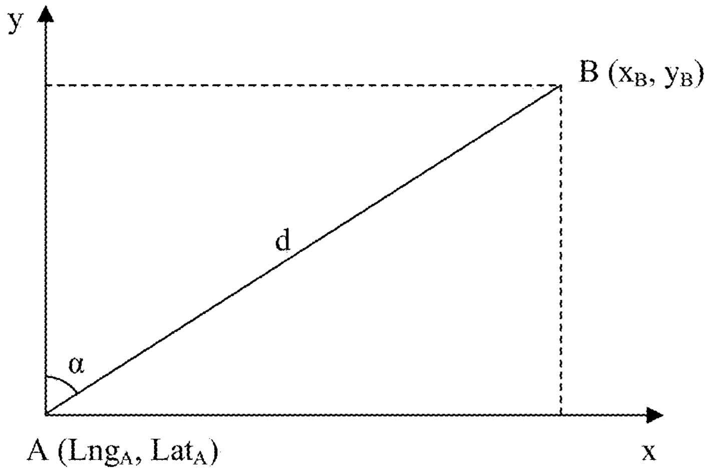
FIG. 7A is a schematic diagram of a method for determining relative position data of an obstacle according to an embodiment of this application.

As shown in FIG. 7A, a point A represents the current vehicle, a point B represents the obstacle, and a coordinate system A-xy is the vehicle coordinate system using the current vehicle as the coordinate origin. The coordinate data $(x_B, y_B)$ of the obstacle in the vehicle coordinate system may be determined according to a distance d between the current vehicle and the obstacle and an angle α of the obstacle relative to the current vehicle in the vehicle coordinate system, which may specifically refer to the following formula 1 and formula 2:

$$x_B = d \times \sin\alpha \quad \text{Formula 1}$$

$$y_B = d \times \cos\alpha \quad \text{Formula 2}$$

Referring to formula 1 and formula 2, a first sine parameter sin α and a first cosine parameter cos α can be determined according to the angle α of the obstacle relative to the current vehicle, the horizontal axis data $x_B$ of the obstacle may be a product of the distance d and the first sine parameter sin α, and the longitudinal axis data $y_B$ of the obstacle may be a product of the distance d and the first cosine parameter cos α.

Figure 7B:
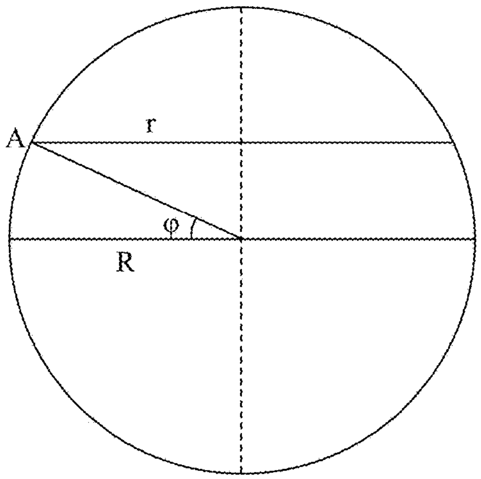
FIG. 7B is a schematic diagram of a longitudinal cross section of a current vehicle according to an embodiment of this application.

The coordinate data of the current vehicle in the world coordinate system may be represented as $(Lng_A, Lat_A)$. $Lng_A$ represents the longitudinal data of the current vehicle, and $Lat_A$ represents the latitudinal data of the current vehicle. A longitudinal cross section shown in FIG. 7B can be determined according to the coordinate data of the current vehicle in the world coordinate system. φ in the longitudinal cross section represents the latitude data of the current vehicle, that is, $\varphi = Lat_A$. R represents a radius of the earth, and r represents a cross-sectional radius of a latitudinal cross section of a latitude at which the point A is located. A process of the performing calculation on the latitudinal data of the current vehicle and the horizontal axis data of the obstacle based on the longitudinal transformation relationship, to obtain a longitudinal variation of the obstacle relative to the current vehicle in the world coordinate system may refer to the following formula 3 and formula 4.

$$r = R \times \cos\varphi = R \times \cos(\text{Lat}_A) \quad \text{Formula 3}$$

$$deltaLng = (x_B/2\pi r) \times 360 = (d \times \sin\alpha \times 360)/2\pi R\cos(\text{Lat}_A) \quad \text{Formula 4}$$

Referring to formula 3 and formula 4, the cross-sectional radius r of the latitudinal cross section of the latitude at which the current vehicle is located can be determined according to the latitudinal data $Lat_A$ and the radius R of the earth, and the longitudinal variation deltaLng of the obstacle relative to the current vehicle in the world coordinate system can be determined according to the cross-sectional radius r and the horizontal axis data $x_B$.

A process of the performing calculation on the longitudinal axis data of the obstacle based on the latitudinal transformation relationship, to obtain a latitudinal variation of the obstacle relative to the current vehicle in the world coordinate system may refer to the following formula 5.

$$deltaLat = \left(y_B/2\pi R\right)\times 360 = (d\times\cos\alpha\times 360)/2\pi R \quad \text{Formula 5}$$

Referring to formula 5, the latitudinal variation deltaLat of the obstacle relative to the current vehicle in the world coordinate system according to the radius R of the earth and the longitudinal axis data $y_B$ of the obstacle.

A process of the determining the longitudinal data of the obstacle according to the longitudinal data of the current vehicle and the longitudinal variation may refer to the following formula 6, and a process of the determining the latitudinal data of the obstacle according to the latitudinal data of the current vehicle and the latitudinal variation may refer to the following formula 7.

$$Lng_B = Lng_A + deltaLng = Lng_A + (d\times\sin\alpha\times 360)/2\pi R\cos(\mathrm{Lat}_A) \quad \text{Formula 6}$$

$$\mathrm{Lat}_B = \mathrm{Lat}_A + deltaLat = \mathrm{Lat}_A + (d\times\cos\alpha\times 360)/2\pi R \quad \text{Formula 7}$$

Referring to formula 6 and formula 7, the longitudinal data $\mathrm{Lng}_B$ of the obstacle is equal to a sum of the longitudinal data $\mathrm{Lng}_A$ of the current vehicle and the longitudinal variation deltaLng; and the latitudinal data $\mathrm{Lat}_B$ of the obstacle is equal to a sum of the latitudinal data $\mathrm{Lat}_A$ of the current vehicle and the latitudinal variation deltaLat.

s13. Display, according to the position data of the obstacle in the world coordinate system, the obstacle identification object for identifying the obstacle in the navigation interface.

Based on the above, for presenting the virtual map of the road scene in the three-dimensional form, the virtual map may be drawn according to the map data corresponding to the environment in which the current vehicle is located, and the map data of the environment in which the current vehicle is located is three-dimensional virtual mapping of the road scene of the environment in which the current vehicle is located. Therefore, the map data includes elevation data (namely, height data). The environment in which the current vehicle is located is divided into a plurality of tiles. Each tile includes one or more lanes. Map data corresponding to each tile includes elevation data of each lane in the tile. The elevation data of the obstacle may be determined according to the elevation data of a lane in which the obstacle is located. Specifically, a process of the displaying, according to the position data of the obstacle in the world coordinate system, the obstacle identification object for identifying the obstacle in the navigation interface may include: determining a target tile to which the obstacle belongs and a target lane to which the obstacle in the target tile according to the position data of the obstacle in the world coordinate system, obtaining the elevation data of the target lane from map data corresponding to the target tile, determining the elevation data of the target lane as the elevation data of the obstacle, and displaying, according to the position data of the obstacle in the world coordinate system and the elevation data of the obstacle, the obstacle identification object for identifying the obstacle in the navigation interface.

Figure 8:
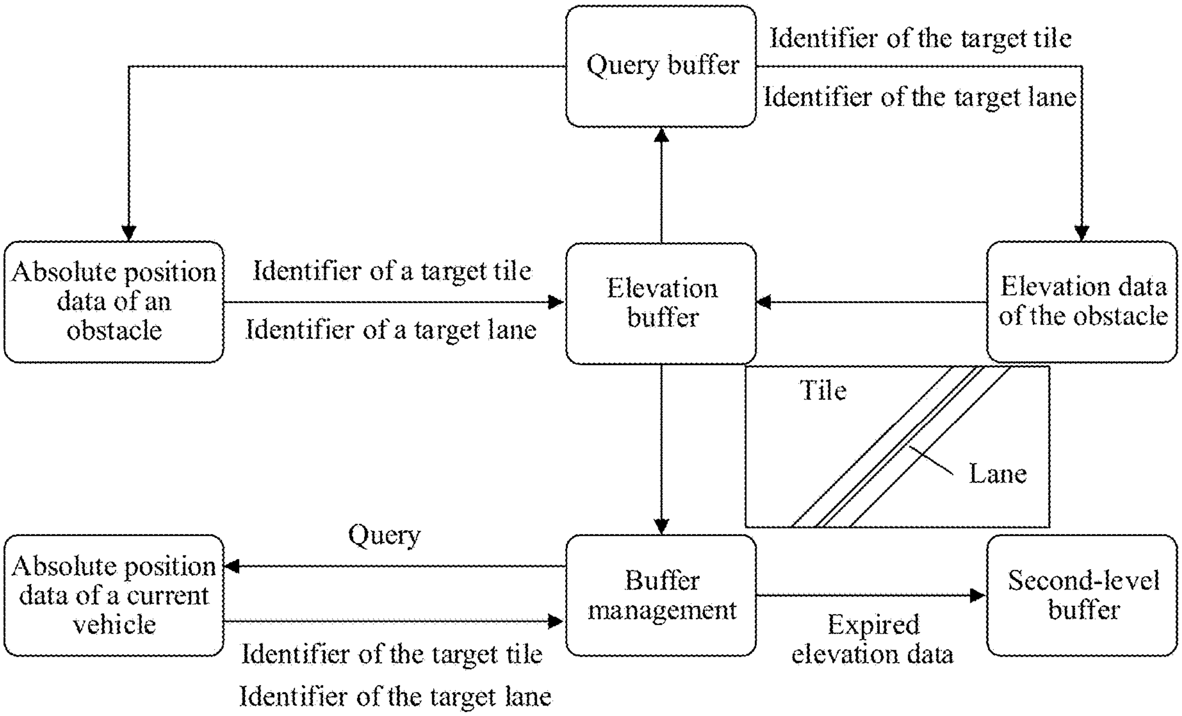
FIG. 8 is a schematic flowchart of a process of querying elevation data of an obstacle according to an embodiment of this application.

More specifically, referring to a procedure of querying elevation data shown in FIG. 8, the elevation data of each lane in the map data is stored in a form that the elevation data of the lane, a lane identifier (Lane ID), an identifier (Tile ID) of a tile to which a lane belongs are mutually related. Some embodiments provide a map database and an elevation buffer module. The elevation buffer module may be configured to buffer elevation data that has been queried from the map database. After the target tile to which the obstacle belongs and the target lane to which the obstacle in the target tile are determined according to the position data (namely, the absolute position data of the obstacle) of the obstacle in the world coordinate system, elevation data corresponding to an identifier of the target tile and an identifier of the target lane may be first queried in the elevation buffer module according to the identifier of the target tile and the identifier of the target lane. If the identifier of the target tile and the elevation data corresponding to the identifier of the target tile can be queried, the queried elevation data can be determined as the elevation data of the obstacle; or if the identifier of the target tile and the elevation data corresponding to the identifier of the target tile cannot be queried, the identifier of the target tile and the elevation data corresponding to the identifier of the target lane needs to queried in the map database according to the identifier of the target tile and the identifier of the target lane. The queried elevation data is determined as the elevation data of the obstacle, and the queried elevation data is related to the identifier of the target tile and the identifier of the target lane and stored in the elevation buffer module. Some embodiments further provide a buffer management module. The buffer management module is configured to calculate expired elevation data in the elevation buffer module according to the position data (that is, the absolute position data of the current vehicle) of the current vehicle in the world coordinate system, and stores the expired elevation data in a second-level buffer. If the elevation data stored in the second-level buffer is not queried in a target period, the expired elevation data is completely discarded. The expired elevation data is elevation data whose corresponding position has a distance from a position of the current vehicle exceeding a distance threshold. In other words, during traveling of the current vehicle, after the current vehicle travels far from the target tile, the elevation data corresponding to the lanes in the target tile is discarded from buffer, so that the buffer can be emptied timely to store elevation data corresponding to lanes in a new tile that the current vehicle enters.

Based on sub-operations s11 to s13, a display position of the obstacle identification object in the navigation interface can be quickly determined through transformation the position data of the obstacle in the vehicle coordinate system into the position data of the obstacle in the world coordinate system. In addition, the obstacle identification object is displayed in the navigation interface according to the obtained elevation data of the obstacle, so that the obstacle identification object displayed in the navigation interface is closer to the obstacle in the road scene. The sub-operations s11 to s13 focus on that displaying the obstacle identification object of the obstacle in the navigation interface is related to the position data of the obstacle in the world coordinate system. In addition, displaying the obstacle identification object of the obstacle in the navigation interface is further related to the obstacle type of the obstacle. There may be one or more obstacles in the environment in which the current vehicle is located, and there may be obstacles of different obstacle types in the one or more obstacles.

In one embodiment, obstacle identification objects of different obstacle types may be the same. For example, a pedestrian and a vehicle are obstacles of different obstacle types, and an obstacle identification object of the pedestrian and an obstacle identification object of the vehicle may be the same, for example, both the obstacle identification object of the pedestrian and the obstacle identification object of the vehicle are a rectangle; and a bus and a van are obstacles of different obstacle types, and an obstacle identification object of the bus and an obstacle identification object of the van may be the same, for example, both the obstacle identification object of the bus and the obstacle identification object of the van are a rectangle. In this embodiment, same obstacle identification objects are used for the obstacles of different obstacle types, so that a rendering time for the obstacle identification object of different obstacle types can be reduced, and for some vehicle terminal with low rendering performance, real-time presentation of the navigation interface can be improved.

In another embodiment, obstacle identification objects of different obstacle types may alternatively be different. The sensing device equipped in the current vehicle can identify the obstacle type of the obstacle, and can display the obstacle identification object of the identified obstacle type in the navigation interface according to the position data of the obstacle in the world coordinate system. For example, an obstacle identification object of a pedestrian and an obstacle identification object of a vehicle are different. The obstacle identification object of the pedestrian may be a three-dimensional model of a human, and the obstacle identification object of the vehicle may be a three-dimensional model of a vehicle. An obstacle identification object of a bus and an obstacle identification object of a van are different. The obstacle identification object of the bus may be a three-dimensional model of a bus, and the obstacle identification object of the van may be three-dimensional model of a van. In this embodiment, a shape of the obstacle identification object presented in the navigation interface is close to an actual shape of the obstacle, and this is convenient for the user of the vehicle to view a quantity of obstacles around the current vehicle and a specific type of each obstacle through the navigation interface, which is vivid, clear, and intuitive, and improves a vehicle navigation effect.

Figure 9:
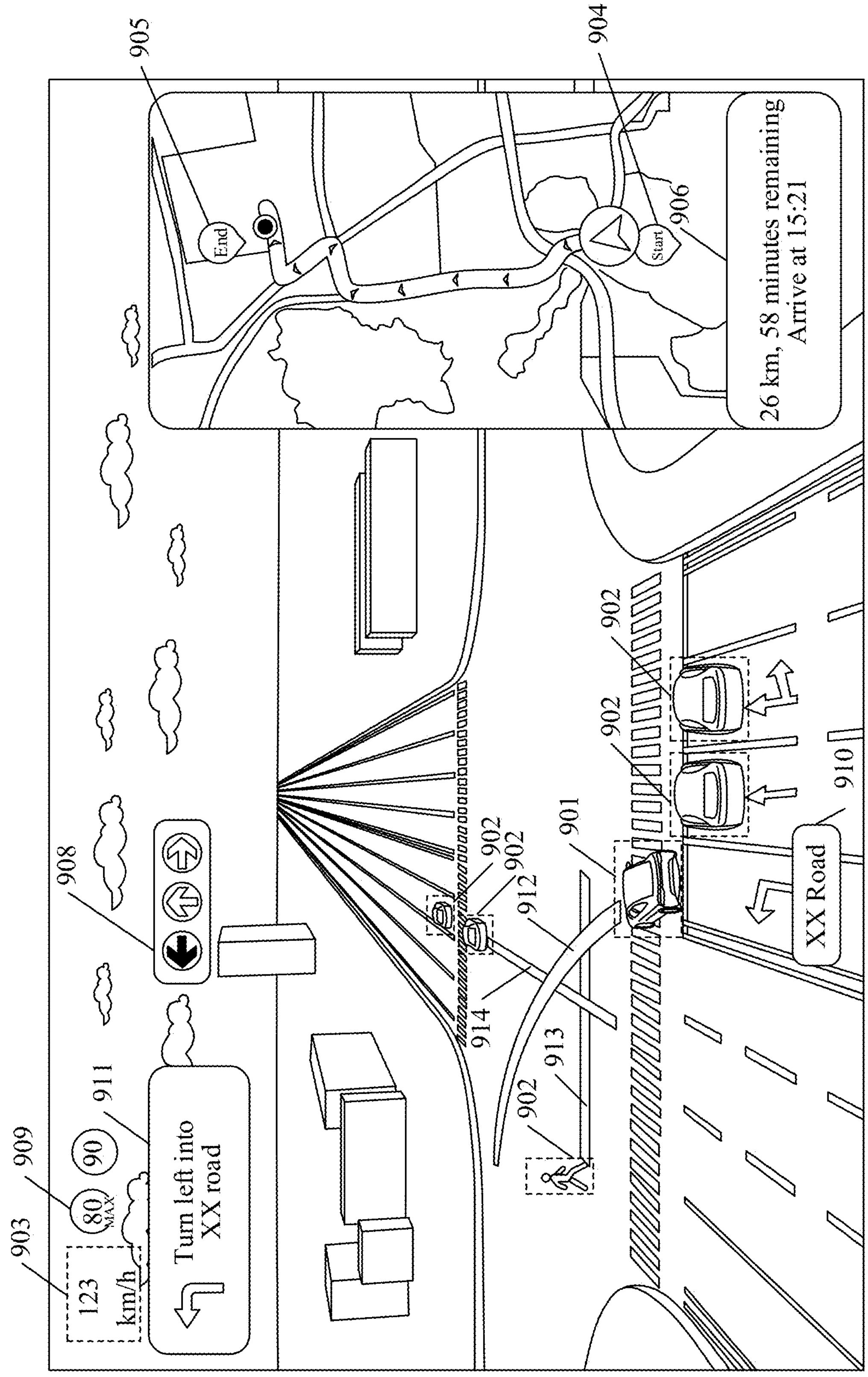
FIG. 9 is a schematic diagram of a navigation interface according to an embodiment of this application.

A navigation interface is shown in FIG. 9. The navigation interface displays a vehicle identification object 901 of the current vehicle and a plurality of obstacle identification objects 902 for identifying obstacles included in the environment in which the current vehicle is located. A plurality of obstacles include pedestrians and vehicles. The obstacle identification object of the pedestrian and the obstacle identification objects of the vehicles are different. In addition, the navigation interface may further display vehicle travel status information, for example, current speed information 903 of the vehicle, departure position information 904 of the vehicle, destination position information 905 of the vehicle, and information 906 about a remaining distance to an end point and about a remaining time to the end point. Moreover, the departure position information 904 of the vehicle, the destination position information 905 of the vehicle, and the information 906 about the remaining distance to the end point and about the remaining time to the end point may be presented in the navigation interface in a form of a mini map. The mini map and the virtual map are two maps in different dimensions. The virtual map focuses on the road scene of the environment in which the current vehicle is located. In other words, the virtual map focuses on local details between the start point and an end point of the current vehicle. However, the mini map focuses on the route, a distance, a travel time, and the like from the start point to the end point of the current vehicle. In other words, the mini map focuses on a whole from the start point to the end point of the current vehicle. In addition, the navigation interface may further display traffic information of the environment in which the current vehicle is located, for example, traffic light information 908, vehicle speed limit information 909, and road name information 910, and may further display navigation information 911 of the current vehicle. The vehicle travel status information, the traffic information, and the navigation information are displayed in the navigation interface, so that content presented in the navigation interface is more diversified, and the user of the vehicle can obtain more information conducive to vehicle driving through the navigation interface, to improve safety during vehicle traveling.

In addition to presenting the vehicle identification object of the current vehicle, the obstacle identification object of the obstacle, the vehicle travel status information, the traffic information, and the navigation information, the navigation interface may further display a predicted mapped trajectory of a motion trajectory of the current vehicle and a predicted mapped trajectory of a motion trajectory of the obstacle. Specifically, speed information of the current vehicle may be obtained, for example, the speed information of the current vehicle may include any one or more of the following: (1) a speed value and a speed direction of the current vehicle, or (2) an acceleration value and an acceleration direction of the current vehicle. The motion trajectory of the current vehicle may be predicted according to the speed information of the current vehicle, and the mapped trajectory of the motion trajectory of the current vehicle is displayed in the navigation interface. As shown in FIG. 9, the navigation interface displays a mapped trajectory 912 of the motion trajectory of the current vehicle. Similarly, the speed information of the obstacle may be obtained. For example, the speed information of the obstacle may include any one or more of the following: (1) a speed value and a speed direction of the obstacle, or (2) an acceleration value and an acceleration direction of the obstacle. The motion trajectory of the obstacle may be predicted according to the speed information of the obstacle, and the mapped trajectory of the motion trajectory of the obstacle is displayed in the navigation interface. As shown in FIG. 9, the navigation interface displays a predicted mapped trajectory 913 of a motion trajectory of a pedestrian obstacle, and displays a predicted mapped trajectory 914 of a motion trajectory of a vehicle obstacle. In this manner, when the predicted mapped trajectory of the motion trajectory of the current vehicle intersects with the predicted mapped trajectory of the motion trajectory of the obstacle, there is a prompt effect on the user of the vehicle of the current vehicle, to prompt the user of the vehicle to avoid the obstacles, improving the safety during vehicle traveling.

S502. Set a display attribute of the warning sign display region when the obstacle enters an early warning region of the current vehicle, to display a warning sign about the obstacle in the navigation interface.

The display attribute of the warning sign display region is set when the obstacle enters the early warning region of the current vehicle, to display the warning sign about the obstacle in the navigation interface. The warning sign may be configured for indicating at least one of the following: that a distance between the current vehicle and the obstacle is less than or equal to an early warning distance corresponding to the early warning region, or a directional relationship between the current vehicle and the obstacle.

In some embodiments, the position data of the obstacle in the vehicle coordinate system is transformed into the position data of the obstacle in the world coordinate system, so that the display position of the obstacle identification object in the navigation interface can be quickly determined, to improve a rendering speed of the obstacle identification object in the navigation interface. The obstacle identification object is displayed in the navigation interface according to the obtained elevation data of the obstacle, so that the obstacle identification object displayed in the navigation interface is closer to the obstacle in the road scene, improving the vehicle navigation effect. Moreover, the content presented in the navigation interface is more diversified. In addition to the vehicle identification object of the current vehicle and the obstacle identification object for identifying the obstacle, the vehicle travel status information, the traffic information, the navigation information, and the like are further displayed. The user of the vehicle can obtain more information conducive to vehicle driving through the navigation interface, to improve the safety during vehicle traveling.

Figure 10:
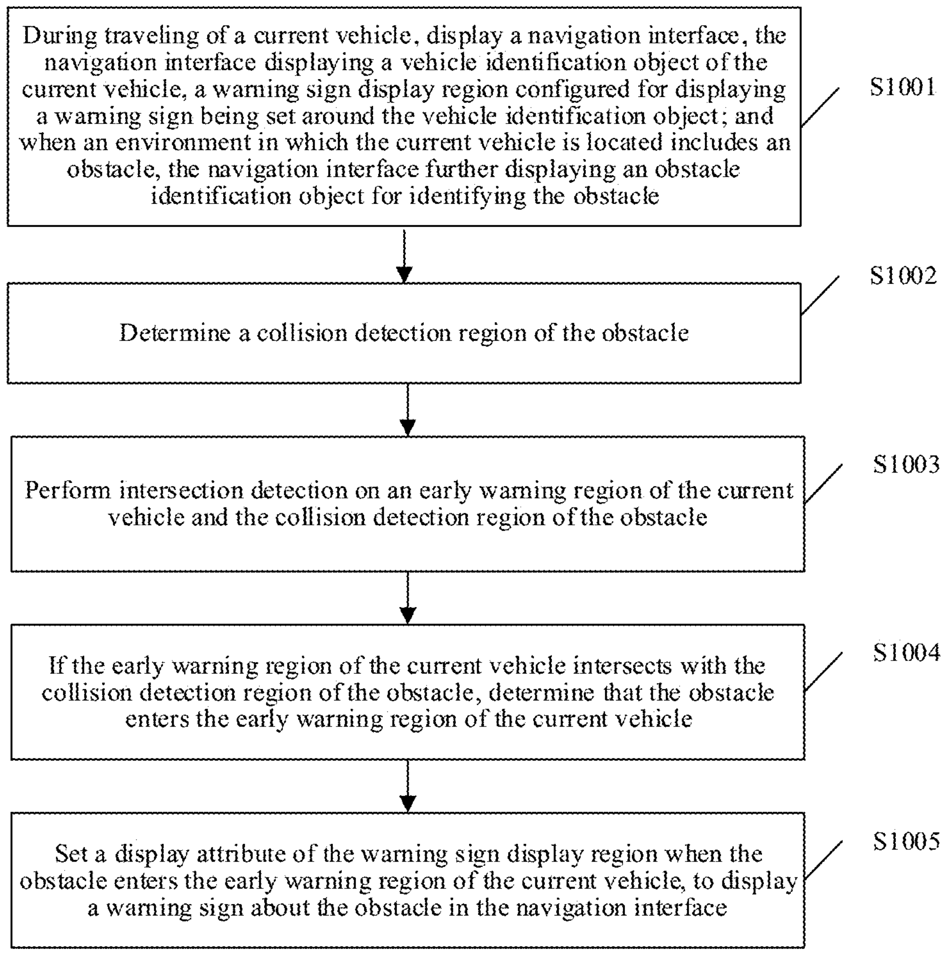
FIG. 10 is a schematic flowchart of another vehicle navigation method according to an embodiment of this application.

An embodiment of this application provides a vehicle navigation method. The vehicle navigation method mainly describes content of determining that an obstacle enters an early warning region of a current vehicle, a presenting form of a warning sign about the obstacle in a navigation interface, and the like. The vehicle navigation method may be performed by the intelligent vehicle terminal 104 in the vehicle navigation system. Referring to FIG. 10, the vehicle navigation method may include the following operation S1001 to operation S1005.

S1001. During traveling of a current vehicle, display a navigation interface, the navigation interface displaying a vehicle identification object of the current vehicle, a warning sign display region configured for displaying a warning sign being set around the vehicle identification object; and when an environment in which the current vehicle is located includes an obstacle, the navigation interface further displaying an obstacle identification object for identifying the obstacle.

In some embodiments, a performing process of operation S1001 is the same as the performing process of operation S501 in the embodiment shown in FIG. 5A. A specific performing process may refer to the description of operation S501 in the embodiment shown in FIG. 5A, and details are not repeated herein.

S1002. Determine a collision detection region of the obstacle.

Figure 11A:
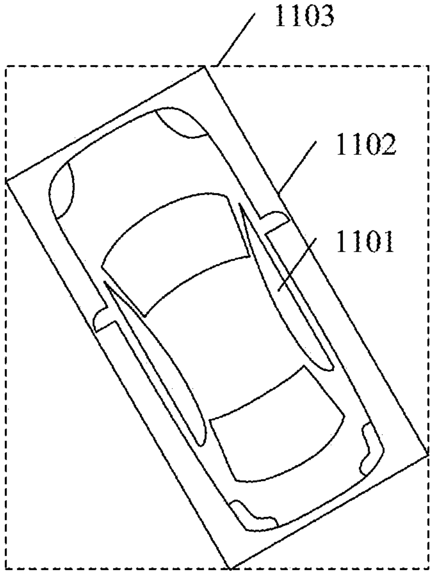
FIG. 11A is a schematic diagram of a collision detection region of an obstacle according to an embodiment of this application.

The collision detection region of the obstacle may be determined according to an enclosed region of the obstacle. Further, the collision detection region of the obstacle may be a bounding region of the enclosed region of the obstacle. Collision between the vehicle and the obstacle usually occurs around the vehicle and around the obstacle. Therefore, the enclosed region of the obstacle is a region that can completely enclose the obstacle from a top view of the obstacle. The enclosed region of the obstacle may be a rectangular region, a circular region, or an elliptical region. A shape of the enclosed region of the obstacle is not limited in some embodiments. The enclosed region and the bounding region of the obstacle are illustrated by using an example in which the obstacle is a vehicle obstacle, and the enclosed region of the obstacle is a rectangular region in FIG. 11A. A bounding region 1103 of an enclosed region 1102 of an obstacle 1101 is a non-rotation bounding rectangle of the enclosed region 1102 of the obstacle 1101.

S1003. Perform intersection detection on an early warning region of the current vehicle and the collision detection region of the obstacle.

Figure 11B:
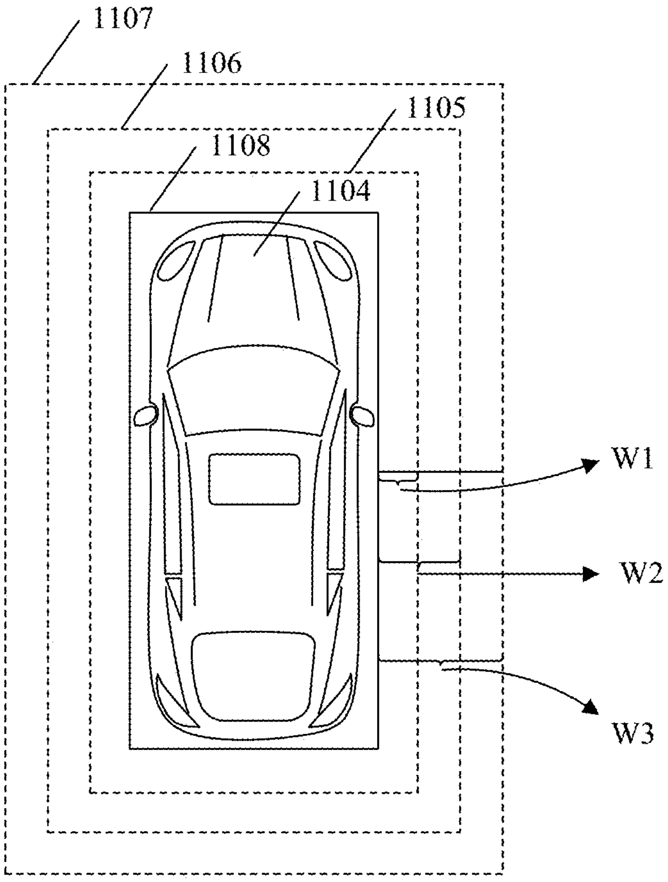
FIG. 11B is a schematic diagram of an early warning region of a current vehicle according to an embodiment of this application.

Before content of the intersection detection performed on the early warning region of the current vehicle and the collision detection region of the obstacle is described, the early warning region of the current vehicle is described. The early warning region of the current vehicle may be formed by enlarging an enclosed region of the current vehicle according to an early warning distance. Similar to the enclosed region of the obstacle, the enclosed region of the vehicle is a region that can completely enclose the current vehicle from a top view of the current vehicle. The enclosed region of the current vehicle may be a rectangular region, a circular region, or an elliptical region. A shape of the enclosed region of the current vehicle is not limited in some embodiments. Further, the early warning region of the current vehicle may include early warning regions respectively corresponding to N warning levels. The early warning regions of the N warning levels are formed by enlarging the enclosed region of the current vehicle according to N different early warning distances, N being a positive integer. The early warning region of the current vehicle is described in FIG. 11B by using an example in which the early warning region includes early warning regions of three warning levels, and the enclosed region of the current vehicle is a rectangular region. The early warning region of a current vehicle 1104 includes a first-level early warning region 1105, a second-level early warning region 1106, and a third-level early warning level 1107. The first-level early warning region 1105 is formed by enlarging an enclosed region 1108 of the current vehicle 1104 according to a first-level early warning distance W1. The second-level early warning region 1106 is formed by enlarging the enclosed region 1108 of the current vehicle 1104 according to a second-level early warning distance W2. The third-level early warning region 1107 is formed by enlarging the enclosed region 1108 of the current vehicle 1104 according to a third-level early warning distance W3. The first-level early warning distance W1 is less than the second-level early warning distance W2, and the second-level early warning distance W2 is less than the third-level early warning distance W3.

Figure 11C:
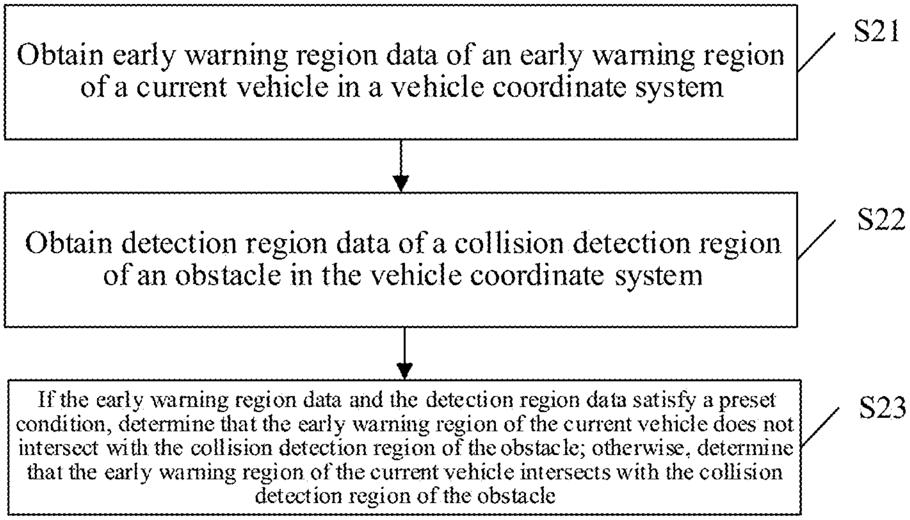
FIG. 11C is a schematic flowchart of intersection detection performed on an early warning region of a current vehicle and a collision detection region of an obstacle according to an embodiment of this application.

After the collision detection region of the obstacle and the early warning region of the current vehicle are described, the content of intersection detection performed on the early warning region of the current vehicle and the collision detection region of the obstacle is described herein. A process of performing intersection detection on the early warning region of the current vehicle and the collision detection region of the obstacle may include the following sub-operations s21 to s23, as shown in FIG. 11C.

s21. Obtain early warning region data of the early warning region of the current vehicle in a vehicle coordinate system.

A process of obtaining the early warning region data of the early warning region of the current vehicle in the vehicle coordinate system may include: obtaining position data of a feature point of the enclosed region of the current vehicle in the vehicle coordinate system, and determining the early warning region data of the early warning region of the current vehicle in the vehicle coordinate system according to the position data of the feature point of the enclosed region of the current vehicle in the vehicle coordinate system and the early warning distance. The early warning region of the current vehicle may be specifically an early warning region formed by enlarging the enclosed region of the current vehicle according to a maximum early warning distance in the early warning regions of the N warning levels. In other words, the position data of the feature point of the enclosed region of the current vehicle in the vehicle coordinate system may be obtained, and the early warning region data of the early warning region of the current vehicle in the vehicle coordinate system may be determined according to the position data of the feature point of the enclosed region of the current vehicle in the vehicle coordinate system and the maximum early warning distance.

Figure 12:
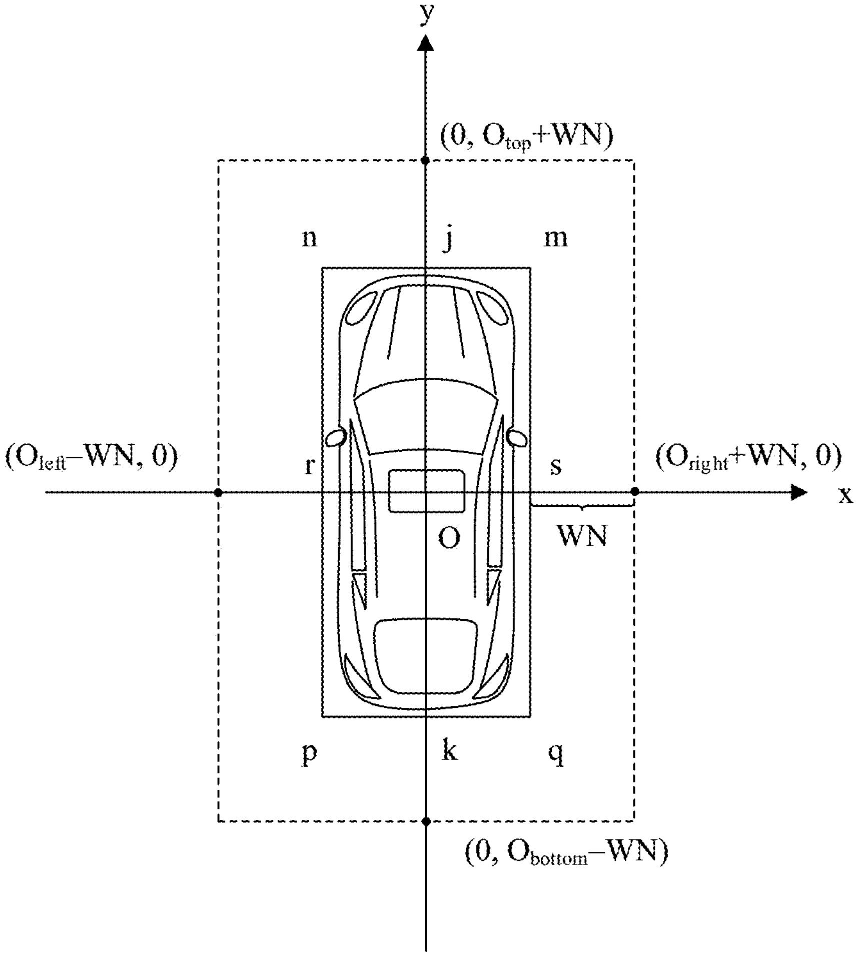
FIG. 12 is a schematic diagram of a method for determining early warning region data according to an embodiment of this application.

As shown in FIG. 12, the enclosed region of the current vehicle is a rectangle mnpq. The early warning region of the current vehicle is a rectangular region formed by enlarging the enclosed region of the current vehicle according to a maximum early warning distance WN. A coordinate system O-xy is the vehicle coordinate system established using a center of the current vehicle as a coordinate origin. The feature point of the enclosed region of the current vehicle may include any one of the following: (1) an upper left corner point n and a lower right corner point q of the enclosed region of the current vehicle, (2) an upper right corner point m and a lower left corner point p of the enclosed region of the current vehicle, or (3) a left intersection point r and a right intersection point s between the enclosed region of the current vehicle and the x-axis and an upper intersection point j and a lower intersection point k between the enclosed region of the current vehicle and the y-axis. An example in which the feature point of the enclosed region of the current vehicle includes the upper left corner point n and the lower right corner point q of the enclosed region of the current vehicle is used. Position data of the upper left corner point n in the vehicle coordinate system may be represented as ($O_{left}$, $O_{top}$), and position data of the lower right corner point q in the vehicle coordinate system may be represented as ($O_{right}$, $O_{bottom}$). The early warning region data of the early warning region of the current vehicle may include a first early warning length boundary value, a second early warning length boundary value, a first early warning width boundary value, and a second early warning width boundary value of the early warning region of the current vehicle in the vehicle coordinate system. The first early warning length boundary value is an upper boundary value of the early warning region of the current vehicle, and may be determined based on longitudinal axis data $O_{top}$ of the upper left corner point n and the maximum early warning distance WN. The first early warning length boundary value is $O_{top}$+WN. The second early warning length boundary value is a lower boundary value of the early warning region of the current vehicle, and may be determined based on longitudinal axis data $O_{bottom}$ of the lower right corner point q and the maximum early warning distance WN. The first early warning length boundary value is $O_{bottom}$−WN. The first early warning width boundary value is a left boundary value of the early warning region of the current vehicle, and may be determined based on longitudinal axis data $O_{left}$ of the upper left corner point n and the maximum early warning distance WN. The first early warning length boundary value is $O_{left}$−WN. The second early width length boundary value is an upper boundary value of the early warning region of the current vehicle, and may be determined based on longitudinal axis data $O_{right}$ of the lower right corner point q and the maximum early warning distance WN. The first early warning length boundary value is $O_{right}$+WN.

s22. Obtain detection region data of the collision detection region of the obstacle in the vehicle coordinate system.

To obtain the detection region data of the collision detection region of the obstacle in the vehicle coordinate system, coordinate transformation between the vehicle coordinate system and an obstacle coordinate system needs to be performed. The obstacle coordinate system is a coordinate system established using the obstacle as a coordinate origin. More specifically, the obstacle coordinate system may be a coordinate system established using a center (a center point of a symmetrical axis of the obstacle) of the obstacle coordinate system as the coordinate origin (O'), using a travel direction of the obstacle as a longitudinal axis (namely, a y' axis), using a right direction of the obstacle as a horizontal axis (namely, an x' axis), and using an upward direction perpendicular to an O'-x'y' plane as a vertical axis (namely, a z' axis).

A process of obtaining the detection region data of the collision detection region of the obstacle in the vehicle coordinate system may include: obtaining position data of a feature point of the enclosed region of the obstacle in an obstacle coordinate system, performing coordinate transformation on the position data of the feature point of the enclosed region of the obstacle in the obstacle coordinate system, to obtain position data of the feature point of the enclosed region of the obstacle in the vehicle coordinate system; and determining the detection region data of the collision detection region of the obstacle in the vehicle coordinate system according to the position data of the feature point of the enclosed region of the obstacle in the vehicle coordinate system.

Figure 13:
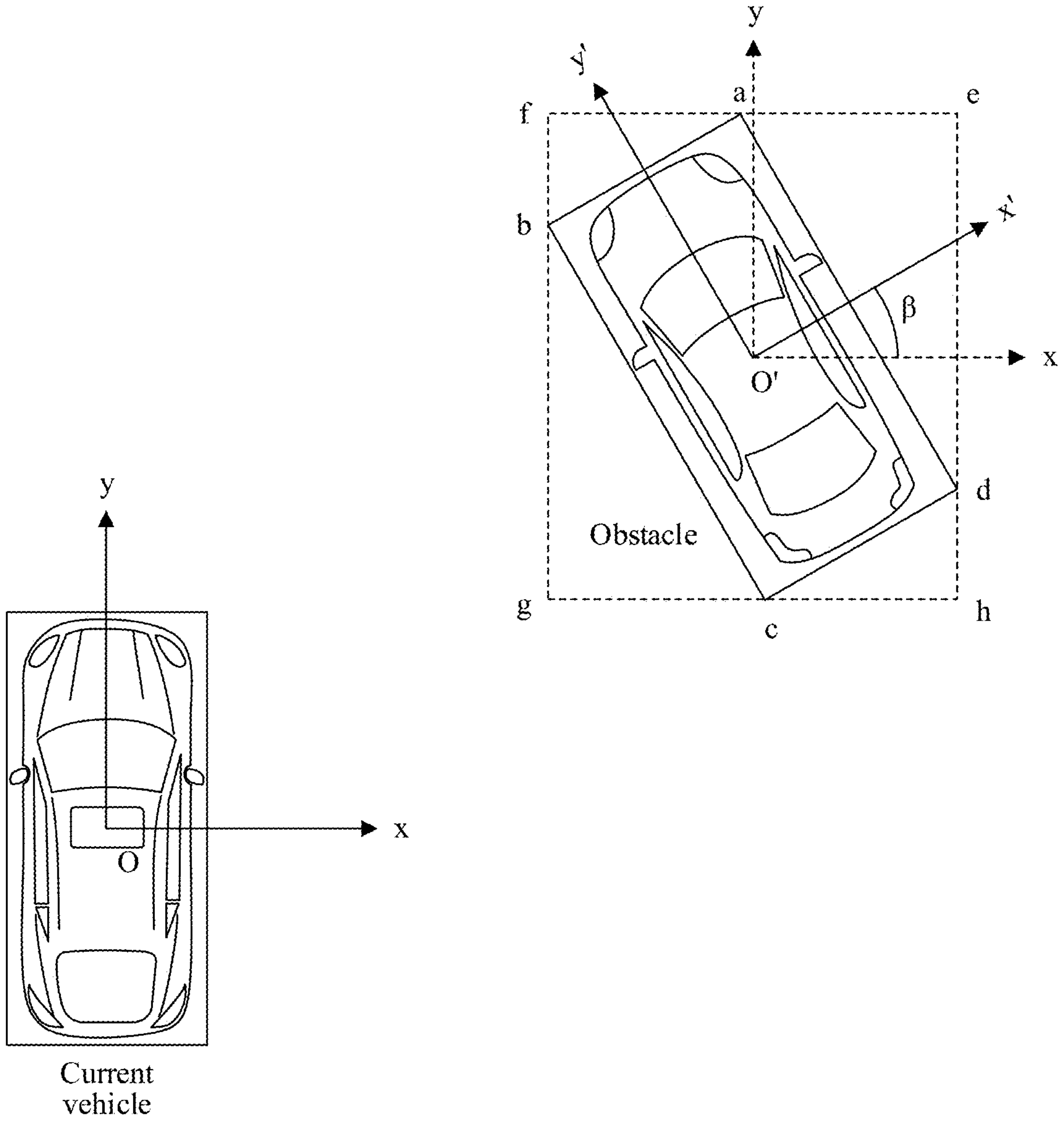
FIG. 13 is a schematic diagram of a method for determining detection region data according to an embodiment of this application.

As shown in FIG. 13, the enclosed region of the obstacle is a rectangle abcd, and the collision detection region of the obstacle is a rectangle efgh. A coordinate system O'-x'y' is a coordinate system using the obstacle as a coordinate origin (O'). The feature point of the enclosed region of the obstacle may include an upper left corner point b, an upper right corner point a, a lower left corner point c, and a lower right corner point d of the enclosed region of the obstacle. Position data of the upper left corner point b in the obstacle coordinate system may be represented as ($O'_{left}$, $O'_{top}$). Position data of the upper right corner point a in the obstacle coordinate system may be represented as ($O'_{right}$, $O'_{top}$). Position data of the lower left corner point c in the obstacle coordinate system may be represented as ($O'_{left}$, $O'_{bottom}$). Position data of the lower right corner point d in the obstacle coordinate system may be represented as ($O'_{right}$, $O'_{bottom}$).

The upper right corner point a of the enclosed region of the obstacle is used as an example for describing a process of the performing coordinate transformation on the position data of the feature point of the enclosed region of the obstacle in the obstacle coordinate system, to obtain position data of the feature point of the enclosed region of the obstacle in the vehicle coordinate system. All processes of coordinate transformation of other feature points than the upper right corner point a of the enclosed region of the obstacle can refer to a process of coordinate transformation of the upper right corner point a of the enclosed region of the obstacle. As shown in FIG. 13, position data of the coordinate origin O' in the vehicle coordinate system O-xy may be represented as ($O_{x'}$, $O_{y'}$). An intermediate coordinate system O"-x"y" is a state of the vehicle coordinate system O-xy translating to the origin of the obstacle coordinate system O'. The intermediate coordinate system O"-x"y" overlaps with the obstacle coordinate system O'-x'y' after rotating by an angle β counterclockwise. The position data of the upper right corner point a in the obstacle coordinate system O'-x'y' may be represented as (x', y'), the position data of the upper right corner point a in the intermediate coordinate system O"-x"y" may be represented as (x", y"), and the position data of the upper right corner point a in the vehicle coordinate system O-xy may be represented as (x, y). A process of determining the position data (x", y") of the upper right corner point a in the intermediate coordinate system O"-x"y" may refer to the following formula 8 and formula 9.

$$x'' = x' \times \cos\beta - y' \times \sin\beta \quad \text{Formula 8}$$

$$y'' = y' \times \cos\beta + x' \times \sin\beta \quad \text{Formula 9}$$

Referring to formula 8 and formula 9, horizontal axis data x" of the upper right corner point a in the intermediate coordinate system O"-x"y" may be determined according to horizontal axis data x' and longitudinal axis data y' of the upper right corner point a in the obstacle coordinate system O'-x'y' and the rotation angle β; and longitudinal axis data y" of the upper right corner point a in the intermediate coordinate system O"-x"y" may be determined according to horizontal axis data x' and longitudinal axis data y' of the upper right corner point a in the obstacle coordinate system O'-x'y' and the rotation angle β.

The position data (x", y") of the upper right corner point a in the intermediate coordinate system O"-x"y" may be translated to the vehicle coordinate system O-xy, to obtain the position data (x, y) of the upper right corner point a in the vehicle coordinate system O-xy, and a translation process may refer to the following formula 10 and formula 11.

$$x = O_{x'} + x'' = O_{x'} + x' \times \cos\beta - y' \times \sin\beta \quad \text{Formula 10}$$

$$y = O_{y'} + y'' = O_{y'} + y' \times \cos\beta + x' \times \sin\beta \quad \text{Formula 11}$$

Referring to formula 10 and formula 11, horizontal axis data x of the upper right corner point a in the vehicle coordinate system O-xy may be determined according to horizontal axis data $O_{x'}$ of the coordinate origin O' in the vehicle coordinate system O-xy and the horizontal axis data x" of the upper right corner point a in the intermediate coordinate system O"-x"y"; and longitudinal axis data y of the upper right corner point a in the vehicle coordinate system O-xy may be determined according to longitudinal axis data $O_{y'}$ of the coordinate origin O' in the vehicle coordinate system O-xy and the longitudinal axis data y" of the upper right corner point a in the intermediate coordinate system O"-x"y".

Similarly, position data of the upper left corner point b in the vehicle coordinate system, the lower left corner point c in the vehicle coordinate system, and the lower right corner point d in the vehicle coordinate system can be determined. The detection region data of the collision detection region of the obstacle may include a second upper boundary coordinate value, a second lower boundary coordinate value, a second left boundary coordinate value, and a second right boundary coordinate value of the obstacle in the vehicle coordinate system. The first upper boundary coordinate value is an upper boundary coordinate value of the collision detection region of the obstacle, and may be the longitudinal axis data y of the upper right corner point a in the vehicle coordinate system, represented as $O'_{top}$. The second lower boundary coordinate value is a lower boundary coordinate value of the collision detection region of the obstacle, and may be the longitudinal axis data of the lower left corner point c in the vehicle coordinate system, represented as $O'_{bottom}$ The second left boundary coordinate value is a left boundary coordinate value of the collision detection region of the obstacle, and may be the horizontal axis data of the upper left corner point b in the vehicle coordinate system, represented as $O'_{left}$. The second right boundary coordinate value is a right boundary coordinate value of the collision detection region of the obstacle, and may be the horizontal axis data of the lower right corner point d in the vehicle coordinate system, represented as $O'_{right}$.

s23. If the early warning region data and the detection region data satisfy a preset condition, determine that the early warning region of the current vehicle does not intersect with the collision detection region of the obstacle; otherwise, determine that the early warning region of the current vehicle intersects with the collision detection region of the obstacle.

Figure 14A:
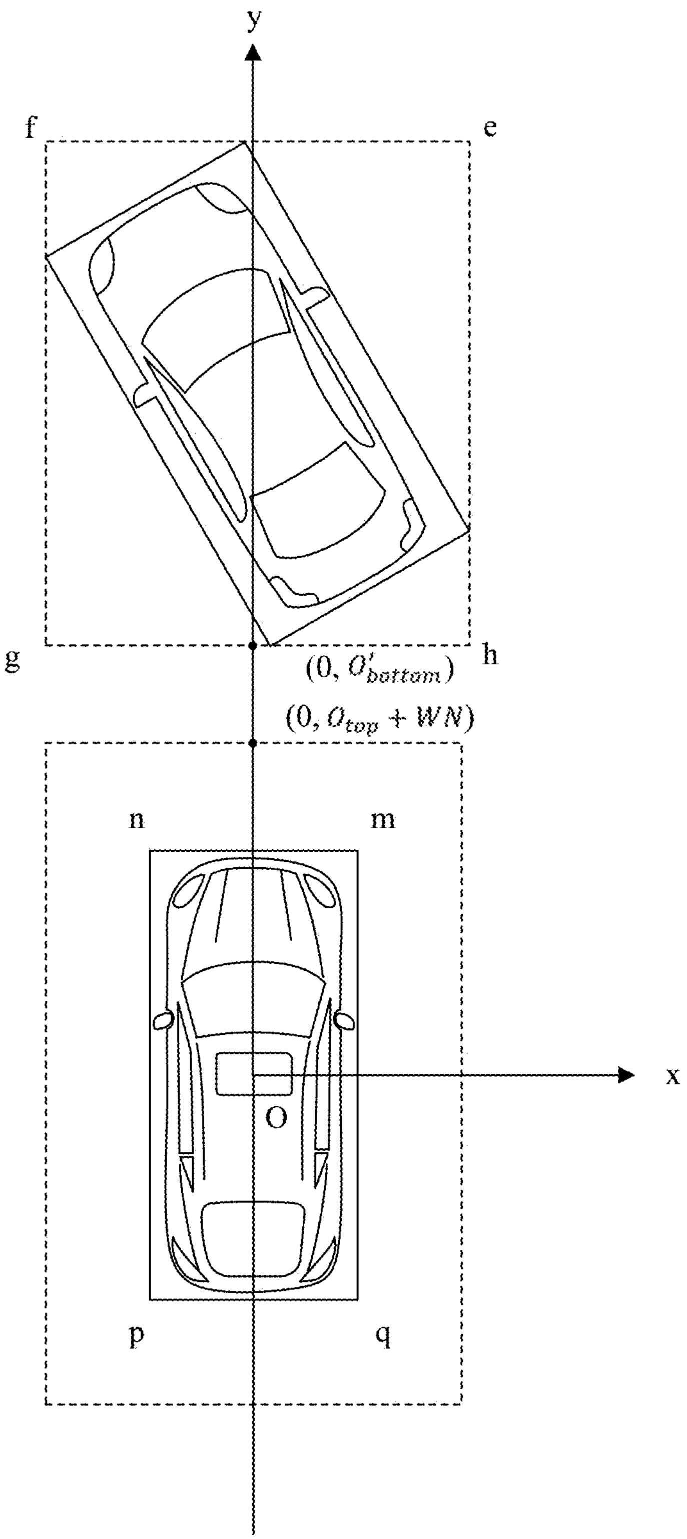
FIG. 14A is a schematic diagram of a collision detection region of an obstacle located on an upper side of an early warning region of a current vehicle according to an embodiment of this application.
Figure 14B:
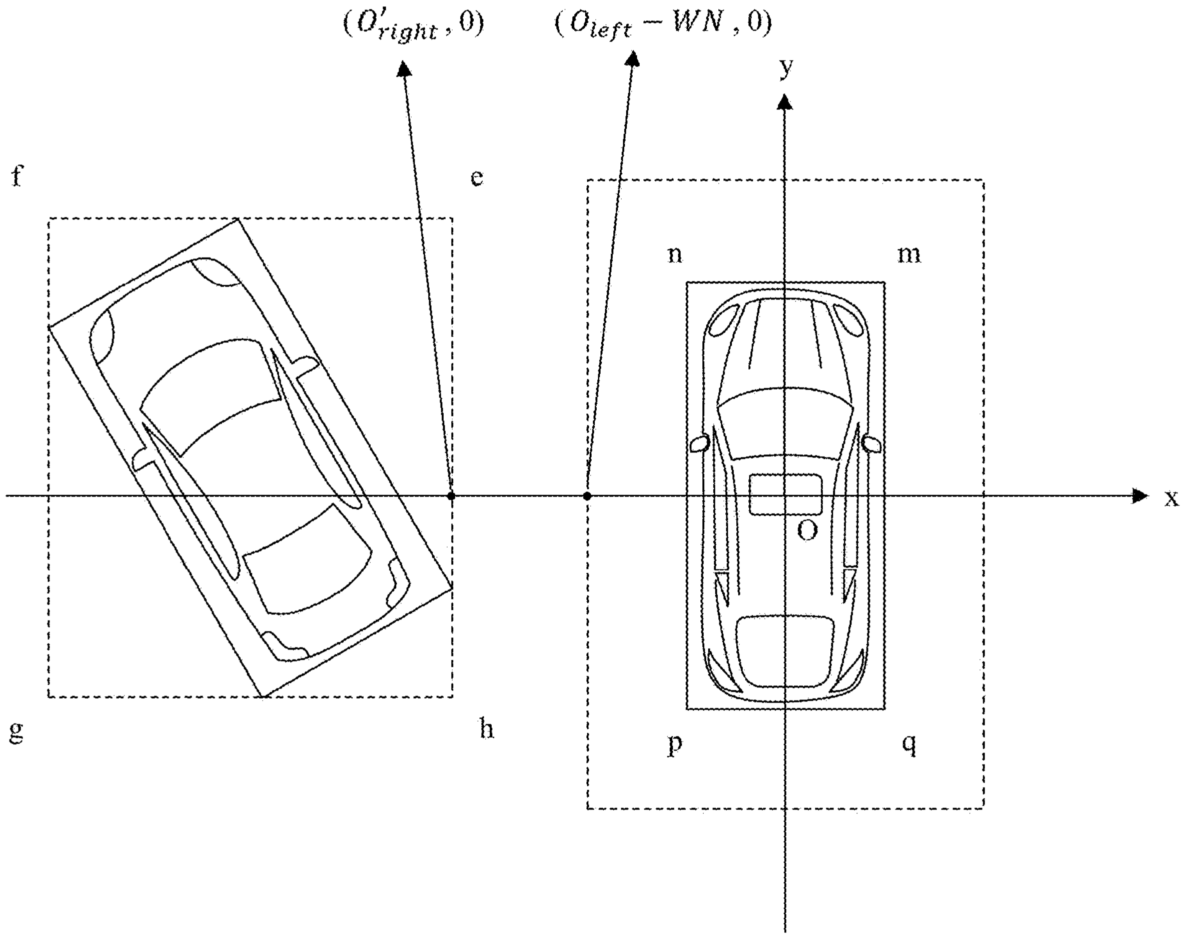
FIG. 14B is a schematic diagram of a collision detection region of an obstacle located on a left side of an early warning region of a current vehicle according to an embodiment of this application.
Figure 14C:
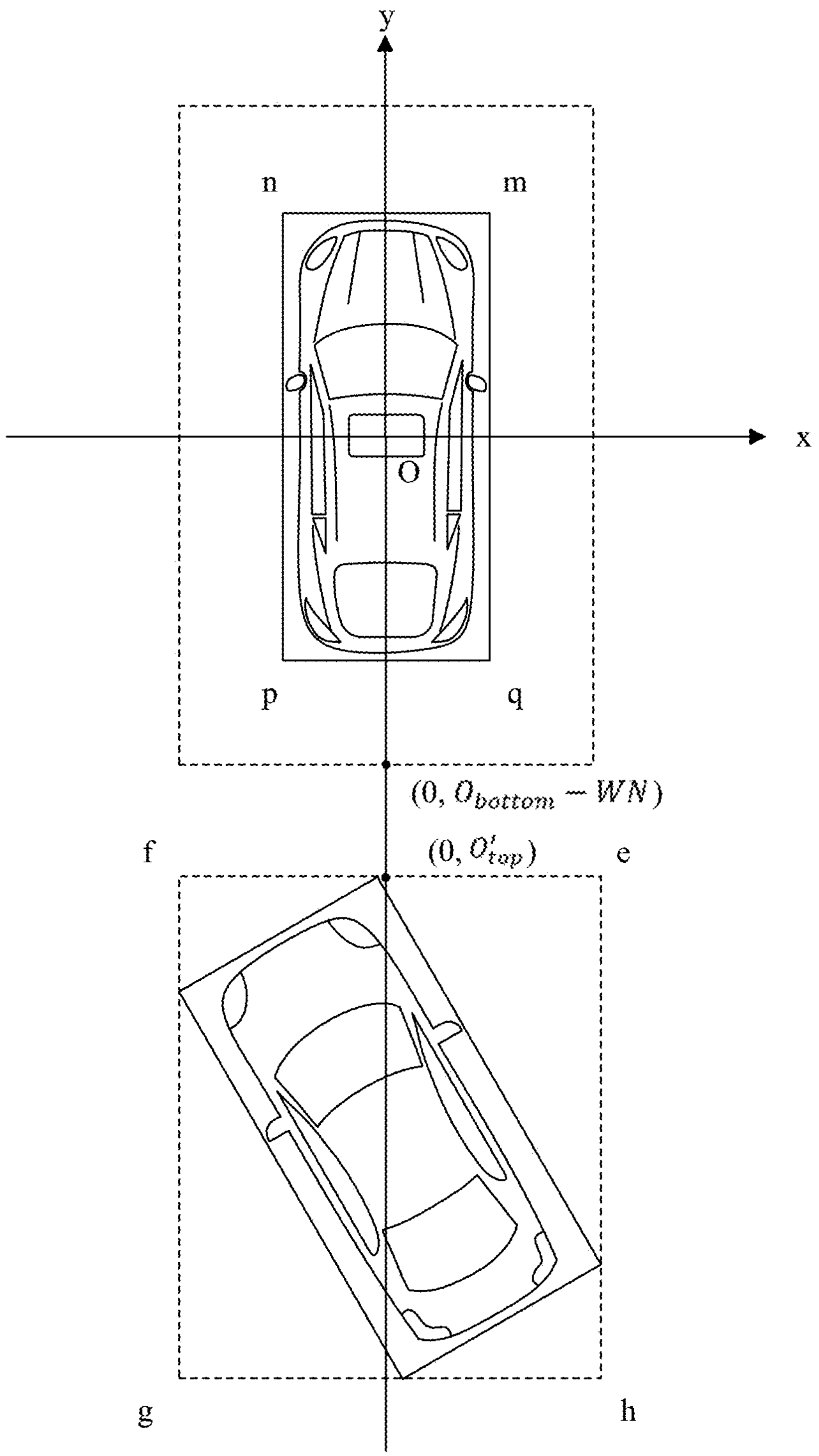
FIG. 14C is a schematic diagram of a collision detection region of an obstacle located on a lower side of an early warning region of a current vehicle according to an embodiment of this application.
Figure 14D:
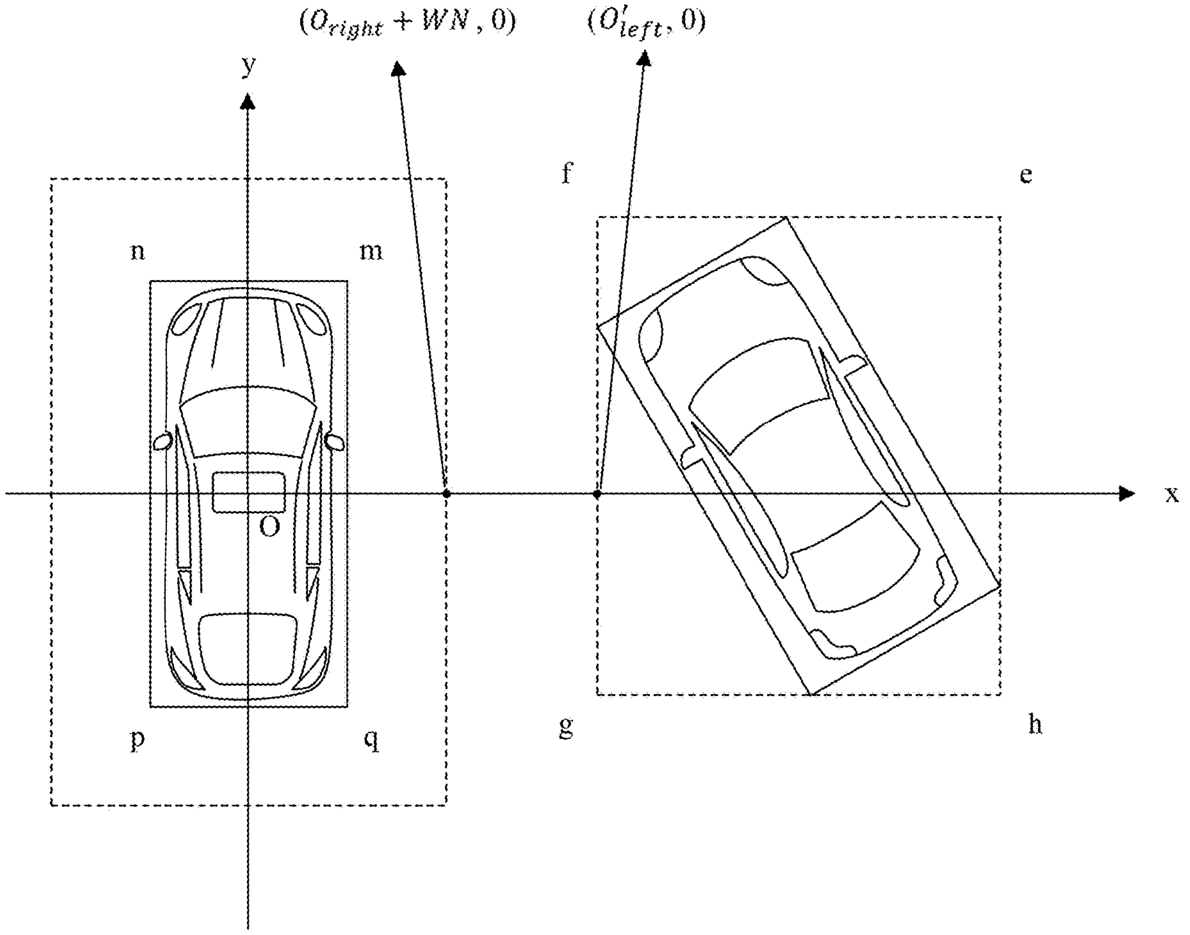
FIG. 14D is a schematic diagram of a collision detection region of an obstacle located on a right side of an early warning region of a current vehicle according to an embodiment of this application.

Based on the above, the early warning region data may include a first upper boundary coordinate value $O_{top}$+WN, a first lower boundary coordinate value $O_{bottom}$−WN, a first left boundary coordinate value $O_{left}$−WN, and a first right boundary coordinate value $O_{right}$+WN. The detection region data may include a second upper boundary coordinate value $O'_{top}$, a second lower boundary coordinate value $O'_{bottom}$, a second left boundary coordinate value $O'_{left}$, and a second right boundary coordinate value $O'_{right}$. If the early warning region data and the detection region data satisfy the preset condition, it is determined that the early warning region of the current vehicle does not intersect with the collision detection region of the obstacle; otherwise, it is determined that the early warning region of the current vehicle intersects with the collision detection region of the obstacle. The preset condition includes at least one of the following: as shown in FIG. 14A, when the collision detection region of the obstacle is located on an upper side of the early warning region of the current vehicle, the first upper boundary coordinate value is less than the second lower boundary coordinate value (that is, $O_{top}+WN<O'_{bottom}$); as shown in FIG. 14B, when the collision detection region of the obstacle is located on a left side of the early warning region of the current vehicle, the first left boundary coordinate value is greater than the second right boundary coordinate value (that is, $O_{left}-WN>O'_{right}$); as shown in FIG. 14C, when the collision detection region of the obstacle is located on a lower side of the early warning region of the current vehicle, the first lower boundary coordinate value is greater than the second upper boundary coordinate value (that is, $O_{bottom}-WN>O'_{top}$); or as shown in FIG. 14D, when the collision detection region of the obstacle is located on a right side of the early warning region of the current vehicle, the first right boundary coordinate value is greater than the second left boundary coordinate value (that is, $O_{right}+WN<O'_{left}$).

Based on the above sub-operations s21 to s23, by detecting whether the early warning region of the current vehicle intersects with the collision detection region of the obstacle, it can be quickly determined whether the obstacle enters the early warning region of the current vehicle. The early warning region of the current vehicle is a region with a range larger than the enclosed region of the current vehicle. The collision detection region is a region with a range larger than the enclosed region of the obstacle. It is determined whether the current vehicle intersects with the obstacle by using the early warning region of the current vehicle and the collision detection region of the obstacle, to ensure that even though the early warning region of the current vehicle intersects with the collision detection region of the obstacle, the current vehicle and the obstacle are still at a distance, thereby improving the safety during vehicle traveling.

S1004. If the early warning region of the current vehicle intersects with the collision detection region of the obstacle, determine that the obstacle enters the early warning region of the current vehicle.

S1005. Set a display attribute of the warning sign display region when the obstacle enters the early warning region of the current vehicle, to display a warning sign about the obstacle in the navigation interface.

In operations S1004 and S1005, if the early warning region of the current vehicle intersects with the collision detection region of the obstacle, it may be determined that the obstacle enters the early warning region of the current vehicle. When the obstacle enters the early warning region of the current vehicle, the display attribute of the warning sign display region may be set, and the warning sign about the obstacle is displayed in the navigation interface. The warning sign may be configured for indicating at least one of the following: a distance between the current vehicle and the obstacle, or a directional relationship between the current vehicle and the obstacle. The warning sign may be directly displayed in the virtual map. Alternatively, to serve as a warning prompt, when the obstacle enters the early warning region of the current vehicle, a region including the vehicle identification object of the current vehicle and the obstacle identification object for identifying the obstacle may be enlarged and displayed in the navigation interface in a form of a top view, and the warning sign is displayed in the region. This is not limited in some embodiments.

In one embodiment, the warning sign may be configured for indicating the distance between the current vehicle and the obstacle. Based on the above, the early warning region of the current vehicle may include early warning regions corresponding to N warning levels. The early warning regions corresponding to the N warning levels are formed by enlarging the enclosed region of the current vehicle according to N different early warning distances. Based on the descriptions in sub-operations s21 to s23, it can be determined that the obstacle enters an early warning region of an $i^{th}$ level in the N warning levels. The early warning region of the $i^{th}$ level may be formed by enlarging the enclosed region of the current vehicle according to an $i^{th}$ early warning distance, N being a positive integer, and i being a positive integer less than or equal to N. For example, the early warning region of the current vehicle may include a first-level early warning region, a second-level early warning region, and a third-level early warning region. The first-level early warning region is formed by enlarging the enclosed region of the current vehicle according to a first-level early warning distance. The second-level early warning region is formed by enlarging the enclosed region of the current vehicle according to a second-level early warning distance. The third-level early warning region is formed by enlarging the enclosed region of the current vehicle according to a third-level early warning distance. The first-level early warning distance is less than the second-level early warning distance, and the second-level early warning distance is less than the third-level early warning distance. If the collision detection region of the obstacle intersects with the third-level early warning region, and does not intersect with the second-level early warning region, the obstacle enters the third-level early warning region of the current vehicle; if the collision detection region of the obstacle intersects with the second-level early warning region, and does not intersect with the first-level early warning region, the obstacle enters the second-level early warning region of the current vehicle; or if the collision detection region of the obstacle intersects with the first-level early warning region, the obstacle enters the first-level early warning region of the current vehicle.

That when the obstacle enters the early warning region corresponding to the $i^{th}$ warning level of the current vehicle, the display attribute of the warning sign display region is set, to display the warning sign about the obstacle in the navigation interface may include: setting the display attribute of the warning sign display region according to the $i^{th}$ warning level, to display the warning sign corresponding to the $i^{th}$ warning level in the navigation interface. The warning sign corresponding to the $i^{th}$ warning level may be configured for indicating: the distance between the current vehicle and the obstacle is less than or equal to the $i^{th}$ early warning distance. The warning sign display region may be an annular region enclosing the vehicle identification object of the current vehicle. The annular region may be a circular annular region, a rectangular annular region, an elliptical annular region, or the like. A shape of the annular region enclosing the vehicle identification object of the current vehicle is not limited in some embodiments.

Figure 15A:
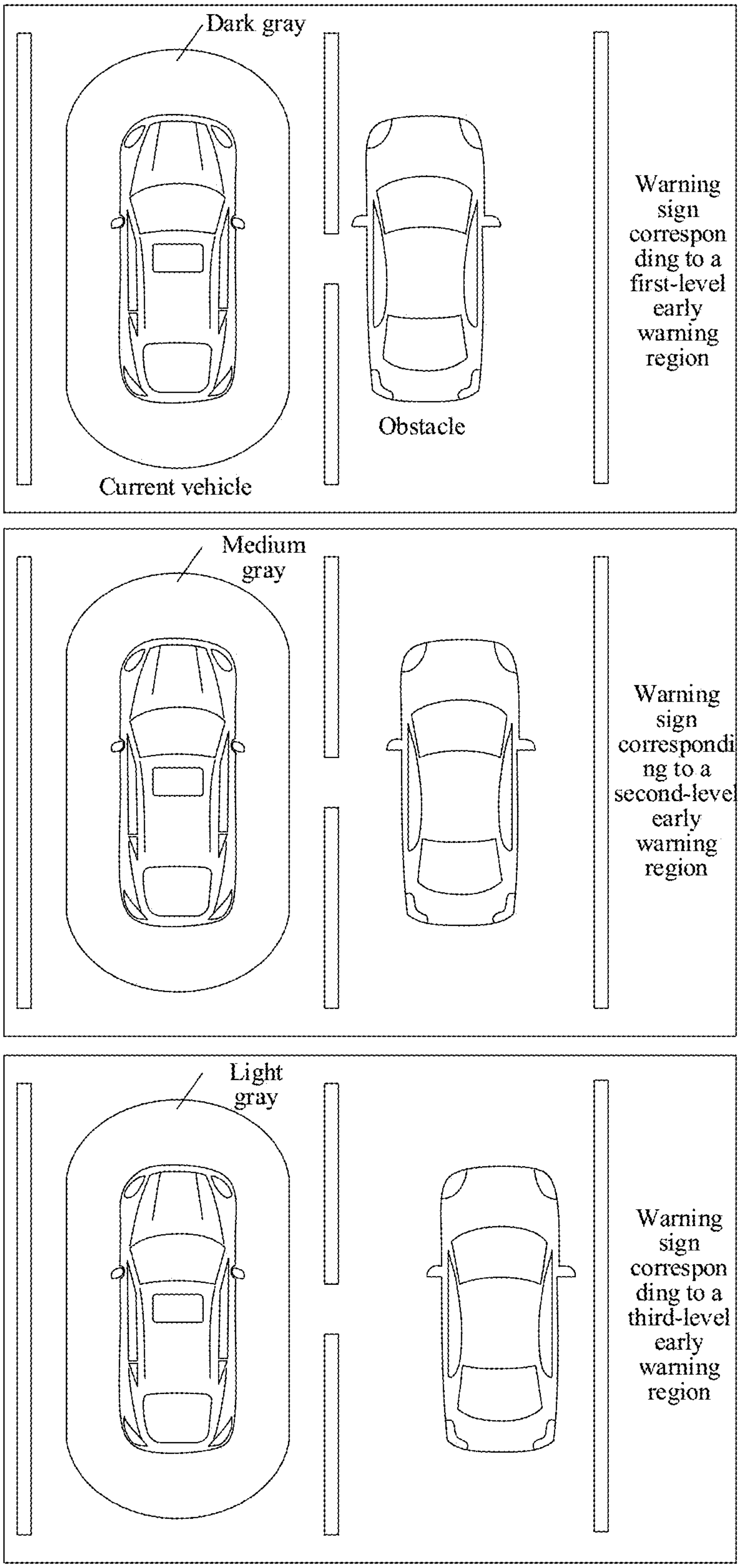
FIG. 15A is a schematic diagram of distinguishing between warning signs by colors according to an embodiment of this application.

In addition, the display attribute of the warning sign display region may include a color attribute, so that a color displayed in the warning sign display region may be set, to display warning signs of different levels. For example: according to the distance between the obstacle and the current vehicle, the colors of the warning sign display region corresponding to the N warning levels are different. The color fades as the obstacle is farther from the current vehicle, and the colors are more conspicuous as the obstacle is closer to the current vehicle. An example in which the early warning region of the current vehicle includes the first-level early warning region, the second-level early warning region, and the third-level early warning region is used. As shown in FIG. 15A, for the first warning level, that is, the obstacle enters the first-level early warning region, the color attribute corresponding to the warning sign display region may be set to dark gray. For the second warning level, that is, the obstacle enters the second-level early warning region, the color attribute corresponding to the warning sign display region may be set to medium gray. For the third warning level, that is, the obstacle enters the third-level early warning region, the color attribute corresponding to the warning sign display region may be set to light gray. That is, a larger early warning distance corresponds to a lighter color of the warning sign, and a smaller early warning distance corresponds to a darker color of the warning sign.

Alternatively, the warning sign display region may include a plurality of subregions, and each of the subregions has a display attribute. The display attributes of different subregions are separately set, to obtain warning signs of different display patterns.

Figure 15B:
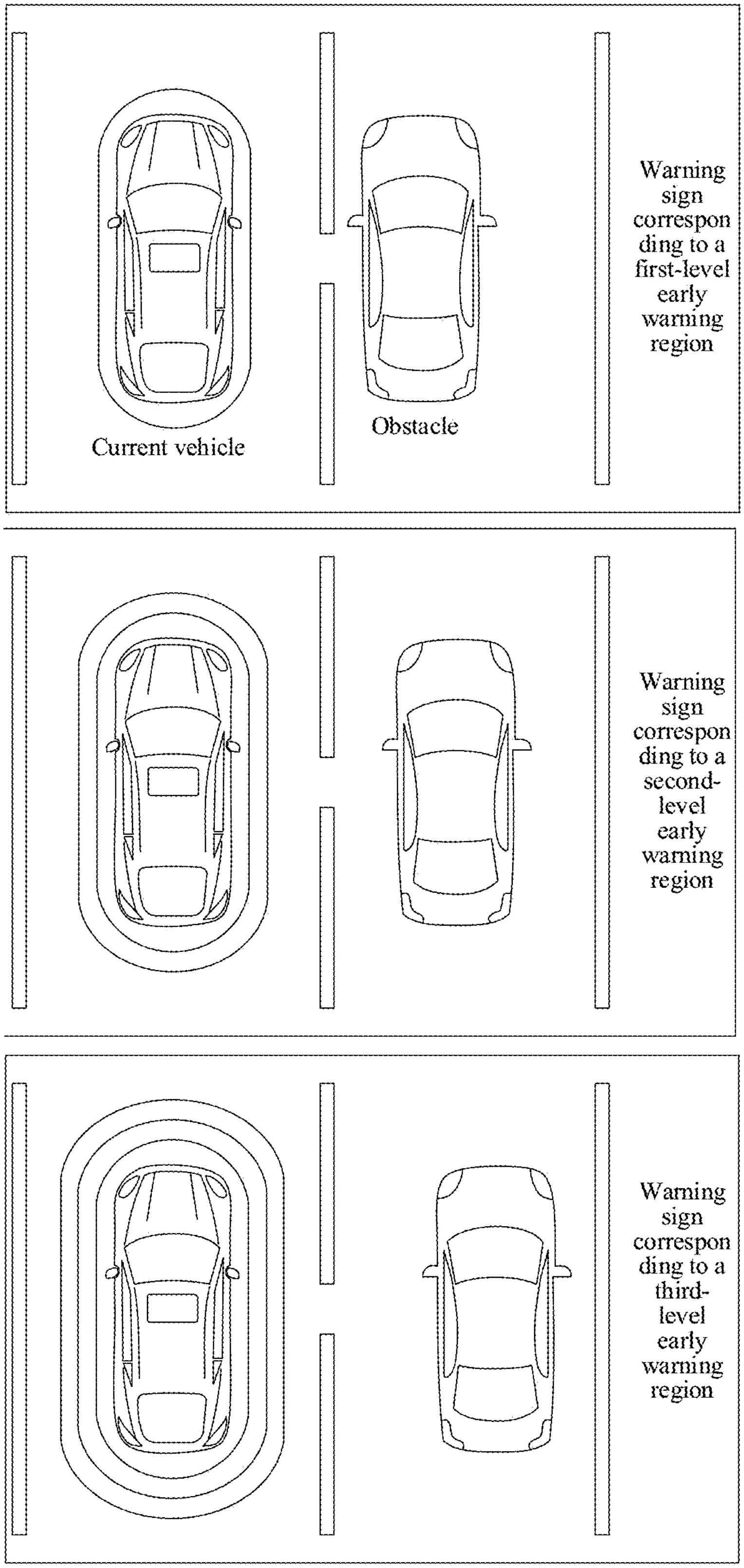
FIG. 15B is a schematic diagram of distinguishing between warning signs by quantities of annular regions according to an embodiment of this application.

In some embodiments, the display attribute of each of subregions may include a hidden attribute, so that display and hiding of different subregions can be set through the hidden attribute, to display warning signs of different sizes. An example in which the early warning region of the current vehicle includes the first-level early warning region, the second-level early warning region, and the third-level early warning region is used. As shown in FIG. 15B, the warning sign display region includes three subregions (each subregion is an annular region). The warning sign corresponding to the first warning level includes one annular region, the warning sign corresponding to the second warning level includes two annular regions, and the warning sign corresponding to the third warning level includes three annular regions. Each subregion (namely, the annular region) has display and hidden attributes. The display and hidden attributes of the subregions are set, to implement presenting of the warning signs of the annular regions of different quantities. That is, a warning sign corresponding to an early warning region with a larger early warning distance includes a larger quantity of annular regions, and a warning sign corresponding to an early warning region with a smaller early warning distance includes a smaller quantity of annular regions.

Figure 15C:
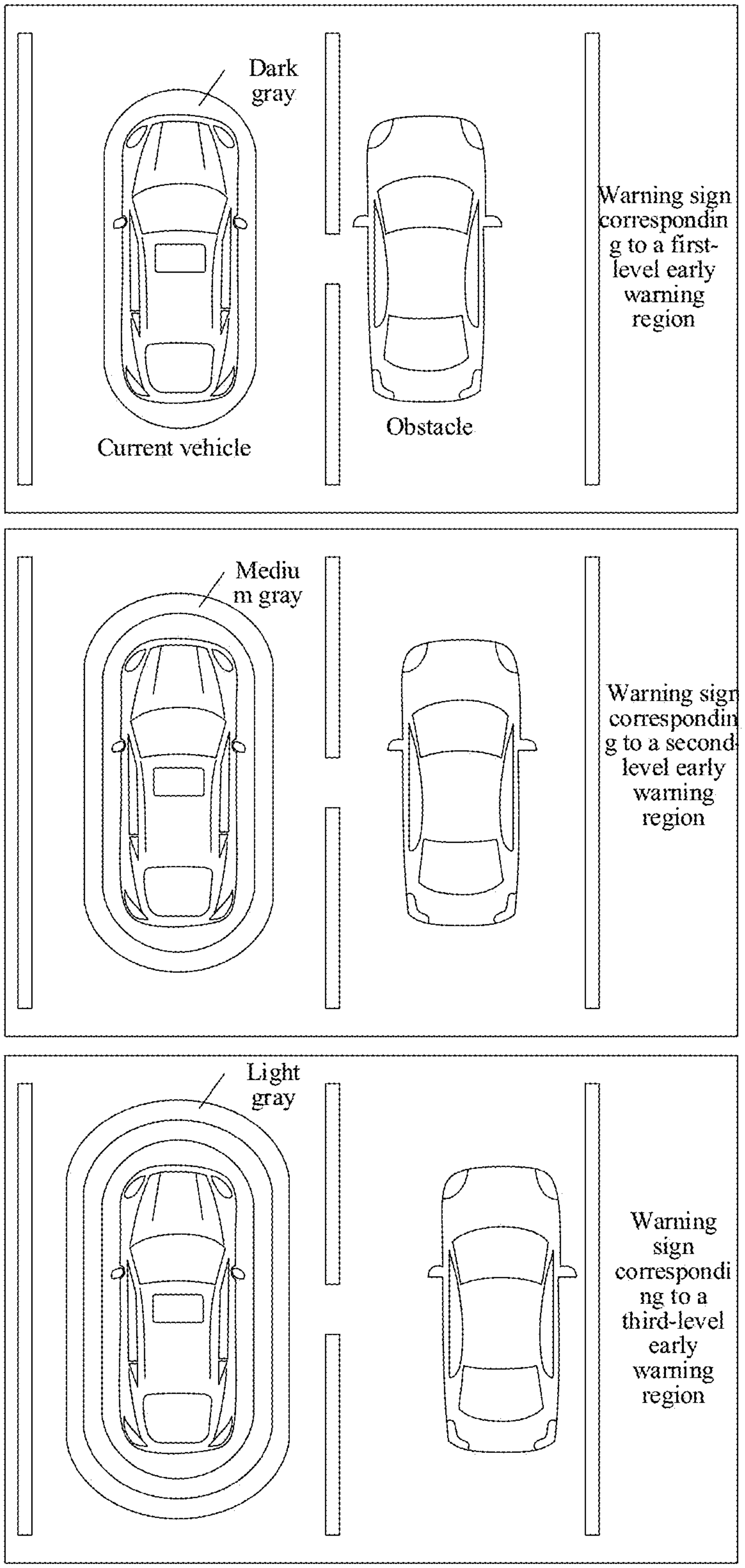
FIG. 15C is a schematic diagram of distinguishing between warning signs by colors and quantities of annular regions according to an embodiment of this application.

Alternatively, the warning sign display region may include a plurality of subregions, and each of subregions has a display attribute. The display attribute includes a color attribute and a hidden attribute. Accordingly, colors of the warning signs corresponding to the N warning levels are different, and the quantity of annular regions included are different. An example in which the early warning region of the current vehicle includes the first-level early warning region, the second-level early warning region, and the third-level early warning region is used. As shown in FIG. 15C, the warning sign corresponding to the first warning level includes one annular region, and is dark gray; the warning sign corresponding to the second warning level includes two annular regions, and is medium gray; and the warning sign corresponding to the third warning level includes three annular regions, and is light gray. That is, a warning sign corresponding to an early warning level with a larger early warning distance includes a larger quantity of annular regions, and has lighter color, and a warning sign corresponding to an early warning level with a smaller early warning distance includes a smaller quantity of annular regions and has darker color. Accordingly, the warning signs of different warning levels are presented in different forms in the navigation interface. The intelligent vehicle terminal can control the travel status of the current vehicle according to the warning signs of different levels, such as adjusting the travel speed and a travel direction of the current vehicle. The user of the vehicle can quickly determine the distance between the current vehicle and the obstacle through the form of the warning sign, thereby improving the safety during vehicle traveling.

Figure 16:
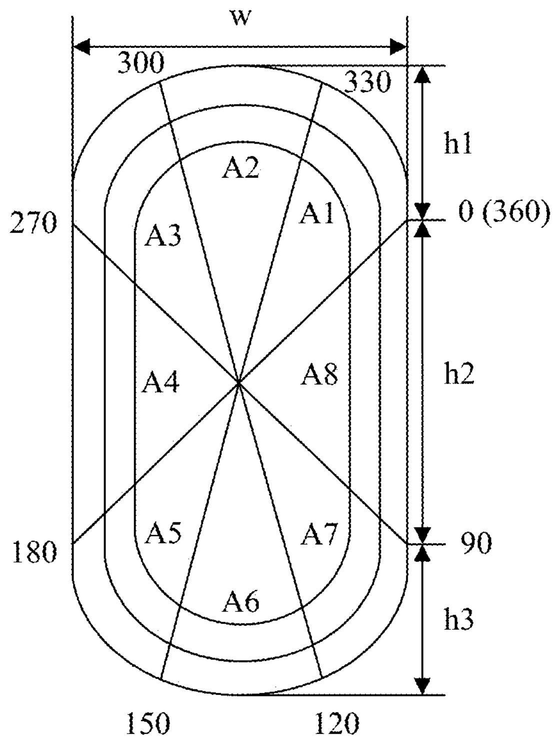
FIG. 16 is a schematic diagram of a method for dividing an early warning region according to an embodiment of this application.

In another embodiment, the warning sign may be configured for indicating the directional relationship between the current vehicle and the obstacle. The warning sign display region may be divided into M subregions (sectors). The M sectors correspond to different angle ranges. The angle ranges of the M sectors may be determined according to angles of the M sectors, M being an integer greater than 1. As shown in FIG. 16, an early warning region formed by a rectangle and two semi-circles is divided into eight sectors, A1 (a right front region of the current vehicle), A2 (a directly front region of the current vehicle), A3 (a left front region of the current vehicle), A4 (a directly left region of the current vehicle), A5 (a left rear region of the current vehicle), A6 (a directly rear region of the current vehicle), A7 (a right rear region of the current vehicle), and A8 (a directly right region of the current vehicle). Angles of the sectors A1, A2, A3, A5, A6, and A7 are the same, and angles of the sectors A4 and A8 are the same. A first length h1 is a distance from a front axial center (a center point of an axis connecting two front wheels) of the current vehicle to a front bumper, and a second length h2 is a distance from the front axial center to a rear axial center (a center point of an axis connecting two rear wheels), and a third length h3 is a distance from the rear axial center to a rear bumper. A target width w is the width of the current vehicle. The angles of the sectors A4 and A8 may be calculated by using the following formula 12.

$$A4 = A8 = 2 \times \arctan(h2/w) \qquad \text{Formula 12}$$

Based on formula 12, the angles of the directly left region and the directly right region of the current vehicle may be calculated according to the distance from the front axial center and the rear axial center and the width of the current vehicle.

The angles of the sectors A1, A2, A3, A5, A6, and A7 may be calculated by using the following formula 13.

$$A1 = A2 = A3 = A5 = A6 = A7 = (2\pi - 2 \times \arctan(h2/w))/6 \qquad \text{Formula 13}$$

After the angles of the sectors are calculated based on formula 12 and formula 13, the angle ranges of the sectors can be determined. For example, the angle of the sector A8 is 90 degrees, and the angle range corresponding to the sector A8 is (0, 90]; the angle of the sector A7 is 30 degrees, and the angle range corresponding to the sector A7 is (90, 120]; the angle of the sector A6 is 30 degrees, and the angle range corresponding to the sector A6 is (120, 150]; the angle of the sector A5 is 30 degrees, and the angle range corresponding to the sector A5 is (150, 180]; the angle of the sector A4 is 90 degrees, and the angle range corresponding to the sector A4 is (180, 270]; the angle of the sector A3 is 30 degrees, and the angle range corresponding to the sector A3 is (270, 300]; the angle of the sector A2 is 30 degrees, and the angle range corresponding to the sector A2 is (300, 330]; and the angle of the sector A1 is 30 degrees, and the angle range corresponding to the sector A1 is (330, 360].

In this case, the display attribute of the warning sign display region may include hidden attributes of the subregions. Setting the display attribute of the warning sign display region, to display the warning sign about the obstacle in the navigation interface may include: determining an angle of the obstacle relative to the current vehicle, where the angle of the obstacle relative to the current vehicle may be specifically an angle of the obstacle relative to the current vehicle in the vehicle coordinate system, and may be determined according to the position data of the obstacle in the vehicle coordinate system; and determining a target sector corresponding to the obstacle in the M sectors according to the angle range to which the angle of the obstacle relative to the current vehicle, setting a hidden attribute of the target subregion to non-hidden, and setting the hidden attributes of other subregions to hidden, to display a warning sign corresponding to the target sector in the navigation interface. The warning sign corresponding to the target sector may be configured for indicating: the obstacle is located in a direction indicated by the angle range corresponding to the target sector of the current vehicle.

Figure 17:
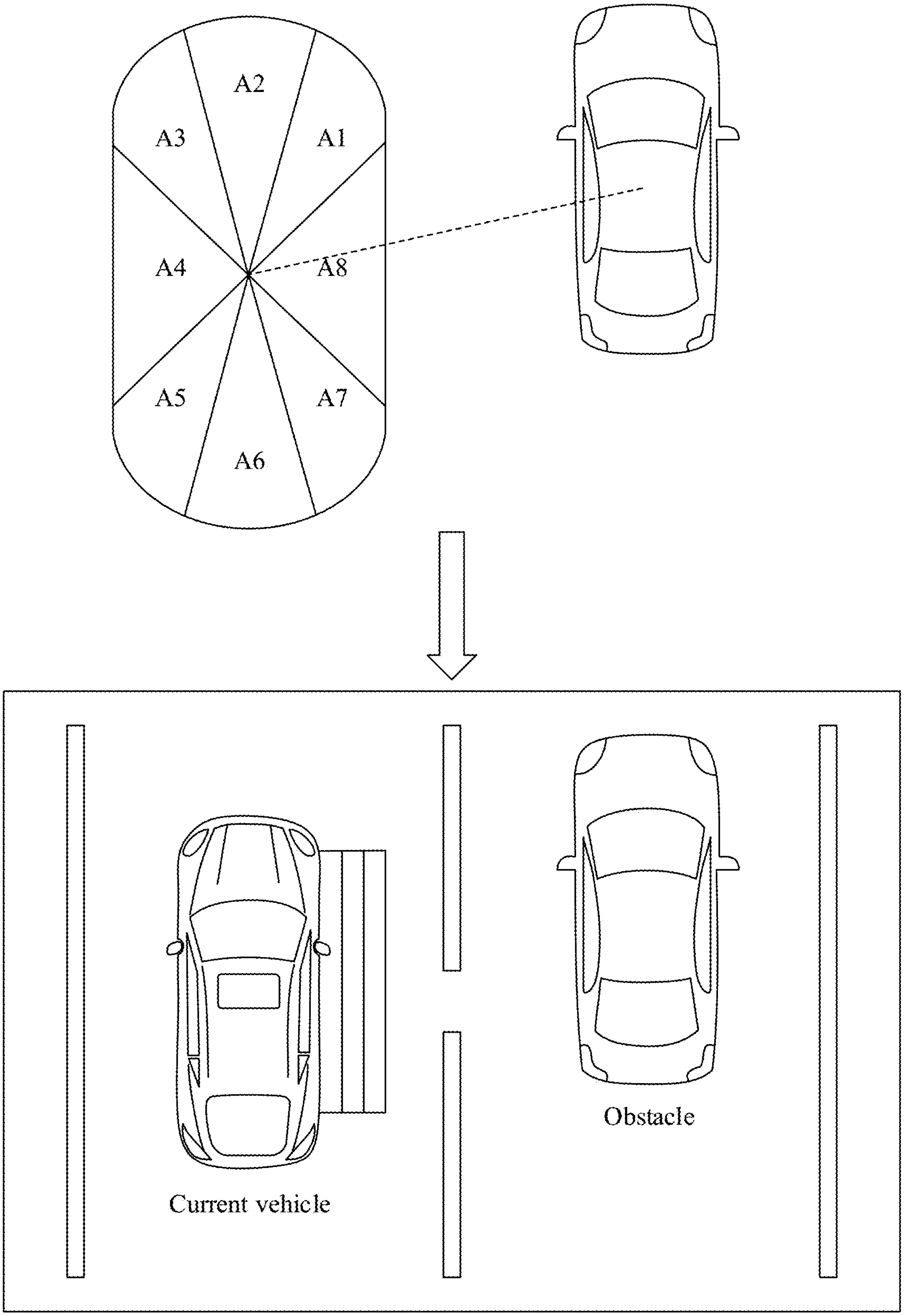
FIG. 17 is a schematic diagram of distinguishing between warning signs by directions according to an embodiment of this application.

The warning sign corresponding to the early warning region may be the annular region enclosing the vehicle identification object of the current vehicle. The annular region may be a circular annular region, a rectangular annular region, an elliptical annular region, or the like. A shape of the annular region enclosing the vehicle identification object of the current vehicle is not limited in some embodiments. When the warning sign display region is divided into the M sectors, the warning sign corresponding to the target sector is displayed in the navigation interface, that is, the hidden attribute corresponding to the target sector is set to non-hidden, and the hidden attributes corresponding to other sectors than the target sector are set to hidden, or the hidden attributes are set to non-hidden but is displayed in a fading manner (for example, brightness of the target sector is higher than that of the other sectors, or transparency of the target sector is lower than that of the other sectors). This is not limited in some embodiments. As shown in FIG. 17, the angle of the obstacle relative to the current vehicle belongs to the sector A8, and the sector A8 may be set to non-hidden, to display a corresponding warning sign in the navigation interface. Accordingly, directions of obstacles relative to the current vehicle are different, and warning signs are presented in the navigation interface in different forms. The user of the vehicle can quickly determine the direction of the obstacle relative to the current vehicle based on the form of the warning sign, to improve the safety during vehicle traveling.

Figure 18:
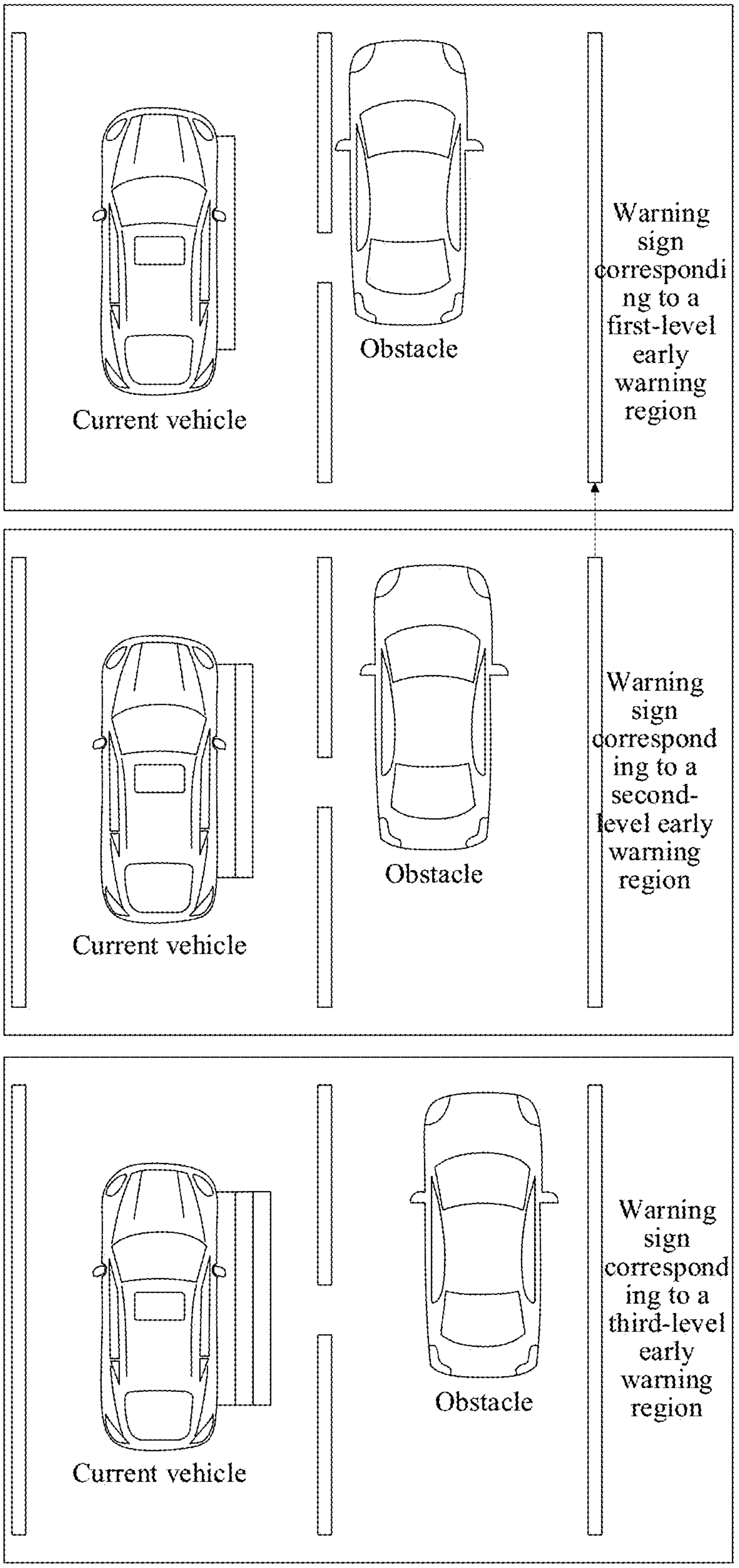
FIG. 18 is a schematic diagram of distinguishing between warning signs by directions and distances according to an embodiment of this application.

In another embodiment, the warning sign may be configured for indicating: the distance between the current vehicle and the obstacle and the directional relationship between the current vehicle and the obstacle. Accordingly, according to the description in sub-operations s21 to s23, it can be determined that the obstacle enters the early warning region of the $i^{th}$ level in the N levels. The early warning region of the $i^{th}$ level may be formed by enlarging the enclosed region of the current vehicle according to the $i^{th}$ early warning distance. The warning sign display region may be divided into the M sectors, and the M sectors correspond to different angle ranges, M being an integer greater than 1, N being a positive integer, and i being a positive integer less than or equal to N. After it is determined that the obstacle enters the early warning region of the $i^{th}$ level in the N levels, the target sector corresponding to the obstacle in the M sectors can be determined according to the angle range to which the angle of the obstacle relative to the current vehicle, and the display attribute of the target sector and the display attributes of other M−1 sectors are respectively set, to display the warning sign corresponding to the target sector in the navigation interface. The warning sign corresponding to the target sector may be configured for indicating: the distance between the current vehicle and the obstacle is less than or equal to the $i^{th}$ early warning distance, and the obstacle is located in a direction indicated by the angle range corresponding to the target sector of the current vehicle. In other words, through the warning sign, the distance between the current vehicle and the obstacle and the direction of the obstacle relative to the current vehicle can be learned. As shown in FIG. 18, directions of the obstacles relative to the current vehicle are the same, but distances between the obstacles and the current vehicle are different, and the warning signs presented in the navigation interface are different. A larger quantity of annular regions in the warning sign indicates a larger distance between the obstacle and the current vehicle. Accordingly, the user of the vehicle can quickly determine the distance between the current vehicle and the obstacle based on the form of the warning sign and the direction of the obstacle relative to the current vehicle, to improve the safety during vehicle traveling.

In some embodiments, when the obstacles enter the early warning region of the current vehicle, the distances between the obstacles and the current vehicle are distinguished by any one or more of different colors and different quantities of annular regions, so that the user of the vehicle can clearly and intuitively learn the distances between the obstacles and the current vehicle, and it is conducive to the user of the vehicle avoiding the obstacles timely and planning driving strategy, to improve the safety during vehicle traveling, and improve a sense of security of the user of the vehicle. Similarly, when the obstacles enter the early warning region of the current vehicle, different annular subregions are used for indicating the directions of the obstacles relative to the current vehicle, so that the user of the vehicle can clearly and intuitively learn the directions of the obstacles relative to the current vehicle, and it is conducive to the user of the vehicle avoiding the obstacles timely and planning the driving strategy, to improve the safety during vehicle traveling, and improve the sense of security of the user of the vehicle. In addition, the warning sign may alternatively indicate the distances between the obstacles and the current vehicle and the directions of the obstacles relative to the current vehicle at the same time, so that a richer and more detailed navigation interface can be displayed to the user of the vehicle, to improve a navigation effect of the navigation interface during vehicle navigation.

The above describes the method in the embodiments of this application in detail. To better implement the above solutions in the embodiments of this application, correspondingly, an apparatus in the embodiments of this application is provided below.

Figure 19:
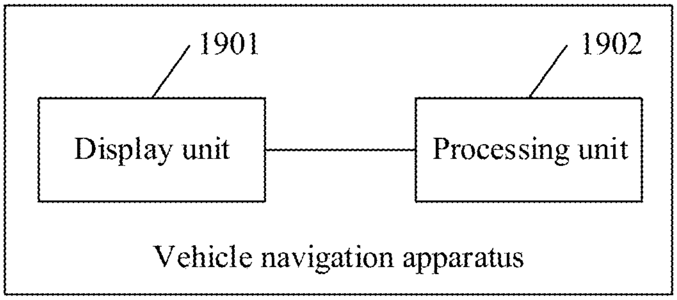
FIG. 19 is a schematic structural diagram of a vehicle navigation apparatus according to an embodiment of this application.

FIG. 19 is a schematic structural diagram of a vehicle navigation apparatus according to an embodiment of this application. The vehicle navigation apparatus may be disposed in a computer device provided in the embodiments of this application. The computer device may be the vehicle terminal involved in the method embodiments. The vehicle navigation apparatus shown in FIG. 19 may be a computer program (including program code) running in the computer device. The vehicle navigation apparatus may be configured to perform a part or all of the operations in the method embodiments shown in FIG. 5A or FIG. 10. Referring to FIG. 19, the vehicle navigation apparatus may include the following units:

- a display unit 1901, configured to display a navigation interface, the navigation interface including a virtual map, the virtual map being configured for presenting a road scene of an environment in which a current vehicle is located; and the navigation interface including a vehicle identification object configured for identifying the current vehicle, a warning sign display region configured for displaying a warning sign being set around the vehicle identification object, when the environment in which the current vehicle is located includes an obstacle, the navigation interface further including an obstacle identification object configured for identifying the obstacle; and
- a processing unit 1902, configured to set a display attribute of the warning sign display region when the obstacle enters an early warning region of the current vehicle, to display a warning sign about the obstacle in the navigation interface, causing a vehicle navigation system of the current vehicle to control a travel status of the current vehicle according to the warning sign, the warning sign being configured for indicating at least one of the following: that a distance between the current vehicle and the obstacle is less than or equal to an early warning distance corresponding to the early warning region, or a directional relationship between the current vehicle and the obstacle.

According to another embodiment of this application, units in the vehicle navigation apparatus shown in FIG. 19 may be separately or all merged into one or several other units, or one or more units may be further divided into a plurality of smaller units in function, and the same operation can be implemented, without affecting implementation of the technical effect of the embodiments of this application. The foregoing units are divided based on logical functions. In an actual application, a function of one unit may alternatively be implemented by a plurality of units, or functions of a plurality of units are implemented by one unit. In other embodiments of this application, the vehicle navigation apparatus may alternatively include other units. In an actual application, the functions may alternatively be implemented assisted by other units, and may be implemented by a plurality of units cooperatively.

According to another embodiment of this application, a computer program (including program code) that can perform the operations involved in some or all of the method shown in FIG. 5A or FIG. 10 may be run on a general-purpose computing device such as a computer that includes processing components and storage components such as a central processing unit (CPU), a random access memory (RAM), and a read-only memory (ROM), to construct the vehicle navigation apparatus shown in FIG. 19 and implement the vehicle navigation method in the embodiments of this application. The computer program may be stored in, for example, a computer-readable storage medium, and is installed in the computing device through the computer-readable storage medium, and is run in the computing device.

In some embodiments, when an environment in which a current vehicle is located includes an obstacle, a navigation interface may display an obstacle identifier of the obstacle. When the obstacle enters an early warning region of the current vehicle, a warning sign about the obstacle may be displayed in the navigation interface. The warning sign may indicate at least one of the following: a distance between the current vehicle and the obstacle, or a directional relationship between the current vehicle and the obstacle. In addition to the current vehicle, some embodiments pays attention to the obstacle of the current vehicle during vehicle navigation, and focuses on any one or more of the distance between the current vehicle and the obstacle and a directional relationship between the current vehicle and the obstacle. Through display of an obstacle identification object and the warning sign about the obstacle in the navigation interface, content presented in the navigation interface can be enriched, thereby improving a vehicle navigation effect, and further improving safety during vehicle traveling.

Figure 20:
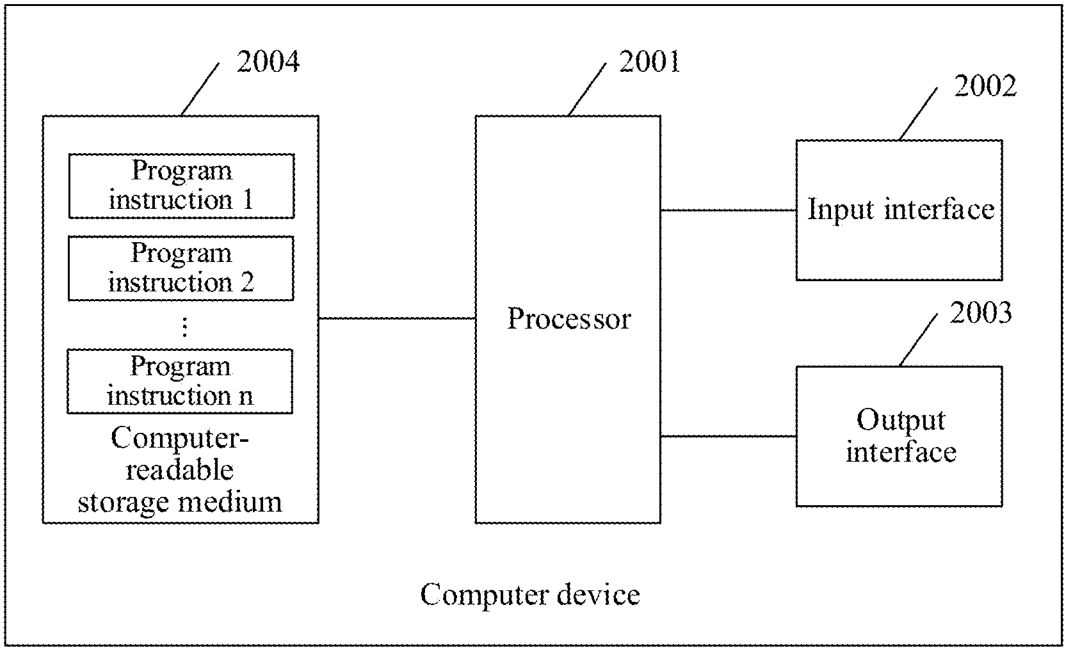
FIG. 20 is a schematic structural diagram of a computer device according to an embodiment of this application.

Based on the above embodiments of the method and the apparatus, an embodiment of this application provides a computer device. The computer device may be the vehicle terminal described above. FIG. 20 is a schematic structural diagram of a computer device according to an embodiment of this application. The computer device shown in FIG. 20 includes at least a processor 2001, an input interface 2002, an output interface 2003, and a computer-readable storage medium 2004. The processor 2001, the input interface 2002, the output interface 2003, and the computer-readable storage medium 2004 may be connected through a bus or in another manner.

The input interface 2002 may be configured to receive data (for example, position data of a current vehicle in a world coordinate system, position data of an obstacle in a vehicle coordinate system, and an obstacle type of the obstacle) transmitted by a positioning device and a sensing device. The output interface 2003 may be configured to transmit a connection confirmation message to the positioning device and the sensing device, to ensure that a connection between the positioning device and the sensing device is stable and not interrupted, which facilitates normal display of a navigation interface.

The computer-readable storage medium 2004 may be stored in a memory of the computer device. The computer-readable storage medium 2004 is configured to store a computer program. The computer program includes computer instructions. The processor 2001 is configured to execute the program instructions stored in the computer-readable storage medium 2004. The processor 2001 (or a central processing unit (CPU)) is a computing core and a control core of the computer device, is configured to implement one or more computer instructions, and is specifically configured to load and execute the one or more computer instructions to implement a corresponding method or a corresponding function.

An embodiment of this application further provides a computer-readable storage medium (memory). The computer-readable storage medium is a memory device in a computer device, and is configured to store a program and data. The computer-readable storage medium herein may include an internal storage medium of the computer device, and certainly may also include an expanded storage medium supported by the computer device. The computer-readable storage medium provides a storage space, and the storage space has an operating system of the computer device stored therein. In addition, one or more computer instructions that are configured to be loaded and executed by the processor are further stored in the storage space. The computer instructions may be one or more computer programs (including program code). The computer-readable storage medium herein may be a high-speed RAM memory, or may be a non-volatile memory, for example, at least one magnetic disk memory; or may be at least one computer-readable storage medium remotely located from the foregoing processor.

In some embodiments, the processor 2001 may load and execute the one or more computer instructions stored in the computer-readable storage medium 2004, to implement corresponding operations of the vehicle navigation method shown in FIG. 5A or FIG. 10.

According to an aspect of this application, a computer program product or a computer program is provided. The computer program product or the computer program includes computer instructions. The computer instructions are stored in a computer-readable storage medium. A processor of a computer device reads the computer instructions from the computer-readable storage medium, and the processor executes the computer instructions, to cause the computer device to perform the vehicle navigation method provided in the above exemplary methods.

The above descriptions are only specific embodiments of this application, but are not intended to limit the protection scope of this application. Any variation or replacement readily figured out by a person skilled in the art within the technical scope disclosed in this application shall fall within the protection scope of this application. Therefore, the protection scope of this application should be subject to the protection scope of the claims.

What is claimed is:

1. A vehicle navigation method, performed by an intelligent vehicle terminal, the method comprising:

displaying a navigation interface, the navigation interface comprising a virtual map, the virtual map presenting a road scene of an environment in which a current vehicle is located, and the navigation interface comprising a vehicle identification object identifying the current vehicle, a warning sign display region for displaying a warning sign being set around the vehicle identification object, when the environment in which the current vehicle is located comprises an obstacle, the navigation interface further comprising an obstacle identification object identifying the obstacle;

setting a display attribute of the warning sign display region when the obstacle enters an early warning region of the current vehicle, wherein the warning sign display region is divided into M areas, and the M areas correspond to different angle ranges, M being an integer greater than 1, and each area has a hidden attribute;

displaying a warning sign about the obstacle in the navigation interface, comprising:

determining an angle of the obstacle relative to the current vehicle;

determining a target area corresponding to the obstacle in the M areas according to an angle range to which the angle of the obstacle relative to the current vehicle belongs; and setting a hidden attribute of the target area to non-hidden, and setting hidden attributes of other M−1 areas in the M sectors to hidden, to display a warning sign corresponding to the target area, to indicate that the obstacle is located in a direction indicated by the angle range corresponding to the target area of the current vehicle; and causing a vehicle navigation system of the current vehicle to control a travel status of the current vehicle according to the warning sign.

2. The method according to claim 1, wherein the early warning region of the current vehicle comprises early warning regions of N warning levels, the early warning regions of the N warning levels being formed by enlarging an enclosed region of the current vehicle according to N different early warning distances; and the early warning region that the obstacle enters is an early warning region of an $i^{th}$ warning level in the N warning levels, N being a positive integer, and i being a positive integer less than or equal to N; and the setting a display attribute of the warning sign display region, to display a warning sign about the obstacle in the navigation interface comprises:

setting the display attribute of the warning sign display region according to the $i^{th}$ warning level, to display a warning sign corresponding to the $i^{th}$ warning level in the navigation interface, to indicate that a distance between the current vehicle and the obstacle is less than or equal to an $i^{th}$ early warning distance, different warning levels corresponding to warning signs with different colors.

3. The method according to claim 1, wherein the early warning region of the current vehicle comprises early warning regions of N warning levels, the early warning regions of the N warning levels being formed by enlarging an enclosed region of the current vehicle according to N different early warning distances; and the early warning region that the obstacle enters is an early warning region of an $i^{th}$ warning level in the N warning levels, N being a positive integer, and i being a positive integer less than or equal to N;

the warning sign display region comprises N subregions, each subregion being an annular region enclosing a current vehicle identification object, and each subregion having a display attribute; and the setting a display attribute of the warning sign display region, to display a warning sign about the obstacle in the navigation interface comprises:

respectively setting display attributes of the N subregions according to the $i^{th}$ warning level, to display a warning sign corresponding to the $i^{th}$ warning level in the navigation interface, to indicate that a distance between the current vehicle and the obstacle is less than or equal to an $i^{th}$ early warning distance, different warning levels corresponding to warning signs with different display patterns.

4. The method according to claim 1, wherein the navigation interface is displayed based on a world coordinate system; and the method further comprises:

obtaining position data of the obstacle in a vehicle coordinate system when the environment in which the current vehicle is located comprises the obstacle, the vehicle coordinate system is a coordinate system established using the current vehicle as a coordinate origin;

performing coordinate transformation on the position data of the obstacle in the vehicle coordinate system, to obtain position data of the obstacle in the world coordinate system; and displaying, according to the position data of the obstacle in the world coordinate system, an obstacle identification object for identifying the obstacle in the navigation interface.

5. The method according to 4, wherein the virtual map is drawn according to map data corresponding to the environment in which the current vehicle is located, the environment in which the current vehicle is located is divided into a plurality of tiles, each tile comprises one or more lanes, and map data corresponding to each tile comprises elevation data of each lane in the tile; and the displaying, according to the position data of the obstacle in the world coordinate system, an obstacle identification object for identifying the obstacle in the navigation interface comprises:

determining, according to the position data of the obstacle in the world coordinate system, a target tile to which the obstacle belongs and a target lane to which the obstacle belongs in the target tile;

obtaining elevation data of the target lane from the map data corresponding to the target tile, and determining the elevation data of the target lane as elevation data of the obstacle; and displaying, according to the position data of the obstacle in the world coordinate system and the elevation data of the obstacle, the obstacle identification object for identifying the obstacle in the navigation interface.

6. The method according to claim 4, wherein the displaying, according to the position data of the obstacle in the world coordinate system, an obstacle identification object for identifying the obstacle in the navigation interface comprises:

identifying an obstacle type of the obstacle; and displaying an obstacle identification object in the obstacle type in the navigation interface according to the position data of the obstacle in the world coordinate system, obstacle identification objects in different obstacle types being different.

7. The method according to claim 4, wherein the performing coordinate transformation on the position data of the obstacle in the vehicle coordinate system, to obtain position data of the obstacle in the world coordinate system comprises:

obtaining position data of the current vehicle in the world coordinate system; and performing coordinate transformation on the position data of the obstacle in the vehicle coordinate system according to the position data of the current vehicle in the world coordinate system, to obtain the position data of the obstacle in the world coordinate system.

8. The method according to claim 7, wherein the performing coordinate transformation on the position data of the obstacle in the vehicle coordinate system according to the position data of the current vehicle in the world coordinate system, to obtain the position data of the obstacle in the world coordinate system comprises:

obtaining a transformation relationship between the world coordinate system and the vehicle coordinate system;

performing calculation on the position data of the obstacle in the vehicle coordinate system based on the transformation relationship, to obtain a position variation of the obstacle relative to the current vehicle in the world coordinate system; and determining the position data of the obstacle in the world coordinate system according to the position data of the current vehicle in the world coordinate system and the position variation.

9. The method according to claim 1, further comprising:

determining a collision detection region of the obstacle;

performing intersection detection on the early warning region of the current vehicle and the collision detection region of the obstacle; and if the early warning region of the current vehicle intersects with the collision detection region of the obstacle, determining that the obstacle enters the early warning region of the current vehicle.

10. The method according to claim 9, wherein the performing intersection detection on the early warning region of the current vehicle and the collision detection region of the obstacle comprises:

obtaining early warning region data of the early warning region of the current vehicle in the vehicle coordinate system, the vehicle coordinate system being a coordinate system established using the current vehicle as a coordinate origin;

obtaining detection region data of the collision detection region of the obstacle in the vehicle coordinate system; and if the early warning region data and the detection region data satisfy a preset condition, determining that the early warning region of the current vehicle does not intersect with the collision detection region of the obstacle; or if the early warning region data and the detection region data do not satisfy a preset condition, determining that the early warning region of the current vehicle intersects with the collision detection region of the obstacle.

11. The method according to claim 10, wherein the early warning region data comprises a first upper boundary coordinate value, a first lower boundary coordinate value, a first left boundary coordinate value, and a first right boundary coordinate value of the early warning region of the current vehicle in the vehicle coordinate system; the detection region data comprises a second upper boundary coordinate value, a second lower boundary coordinate value, a second left boundary coordinate value, and a second right boundary coordinate value of the collision detection region of the obstacle in the vehicle coordinate system; and the preset condition comprises at least one of the following:

the first upper boundary coordinate value is less than the second lower boundary coordinate value;

the first left boundary coordinate value is greater than the second right boundary coordinate value;

the first lower boundary coordinate value is greater than the second upper boundary coordinate value; or the first right boundary coordinate value is less than the second left boundary coordinate value.

12. The method according to claim 10, wherein the collision detection region of the obstacle is determined according to an enclosed region of the obstacle; and the obtaining detection region data of the collision detection region of the obstacle in the vehicle coordinate system comprises:

obtaining position data of a feature point of the enclosed region of the obstacle in an obstacle coordinate system, the obstacle coordinate system being a coordinate system established using the obstacle as a coordinate origin;

performing coordinate transformation on the position data of the feature point of the enclosed region of the obstacle in the obstacle coordinate system, to obtain position data of the feature point of the enclosed region of the obstacle in the vehicle coordinate system; and determining the detection region data of the collision detection region of the obstacle in the vehicle coordinate system according to the position data of the feature point of the enclosed region of the obstacle in the vehicle coordinate system.

13. The method according to claim 10, wherein the early warning region of the current vehicle is formed by enlarging an enclosed region of the current vehicle according to an early warning distance; and the obtaining early warning region data of the early warning region of the current vehicle in the vehicle coordinate system comprises:

obtaining position data of a feature point of the enclosed region of the current vehicle in the vehicle coordinate system; and determining the early warning region data of the early warning region of the current vehicle in the vehicle coordinate system according to the position data of the feature point of the enclosed region of the current vehicle in the vehicle coordinate system and the early warning distance.

14. The method according to claim 1, further comprising:

obtaining speed information of the current vehicle;

predicting a motion trajectory of the current vehicle according to the speed information of the current vehicle; and displaying a mapped trajectory of the motion trajectory in the navigation interface.

15. A computer device, comprising:

a processor, configured to implement a computer program; and a computer-readable storage medium, the computer-readable storage medium having a computer program stored therein, the computer program being configured for being loaded by the processor and performing a vehicle navigation method, comprising:

displaying a navigation interface, the navigation interface comprising a virtual map, the virtual map presenting a road scene of an environment in which a current vehicle is located, and the navigation interface comprising a vehicle identification object identifying the current vehicle, a warning sign display region for displaying a warning sign being set around the vehicle identification object, when the environment in which the current vehicle is located comprises an obstacle, the navigation interface further comprising an obstacle identification object identifying the obstacle;

setting a display attribute of the warning sign display region when the obstacle enters an early warning region of the current vehicle, wherein the warning sign display region is divided into M areas, and the M areas correspond to different angle ranges, M being an integer greater than 1, and each area has a hidden attribute;

displaying a warning sign about the obstacle in the navigation interface, comprising:

determining an angle of the obstacle relative to the current vehicle;

determining a target area corresponding to the obstacle in the M areas according to an angle range to which the angle of the obstacle relative to the current vehicle belongs; and setting a hidden attribute of the target area to non-hidden, and setting hidden attributes of other M−1 areas in the M sectors to hidden, to display a warning sign corresponding to the target area, to indicate that the obstacle is located in a direction indicated by the angle range corresponding to the target area of the current vehicle; and causing a vehicle navigation system of the current vehicle to control a travel status of the current vehicle according to the warning sign.

16. The computer device according to claim 15, wherein the early warning region of the current vehicle comprises early warning regions of N warning levels, the early warning regions of the N warning levels being formed by enlarging an enclosed region of the current vehicle according to N different early warning distances; and the early warning region that the obstacle enters is an early warning region of an $i^{th}$ warning level in the N warning levels, N being a positive integer, and i being a positive integer less than or equal to N; and the setting a display attribute of the warning sign display region, to display a warning sign about the obstacle in the navigation interface comprises:

setting the display attribute of the warning sign display region according to the $i^{th}$ warning level, to display a warning sign corresponding to the $i^{th}$ warning level in the navigation interface, to indicate that a distance between the current vehicle and the obstacle is less than or equal to an $i^{th}$ early warning distance, different warning levels corresponding to warning signs with different colors.

17. A non-transitory computer-readable storage medium, the computer-readable storage medium having a computer program stored therein, the computer program being configured for being loaded by a processor and performing a vehicle navigation method, comprising:

displaying a navigation interface, the navigation interface comprising a virtual map, the virtual map presenting a road scene of an environment in which a current vehicle is located, and the navigation interface comprising a vehicle identification object identifying the current vehicle, a warning sign display region for displaying a warning sign being set around the vehicle identification object, when the environment in which the current vehicle is located comprises an obstacle, the navigation interface further comprising an obstacle identification object identifying the obstacle;

setting a display attribute of the warning sign display region when the obstacle enters an early warning region of the current vehicle, wherein the warning sign display region is divided into M areas, and the M areas correspond to different angle ranges, M being an integer greater than 1, and each area has a hidden attribute;

displaying a warning sign about the obstacle in the navigation interface, comprising:

determining an angle of the obstacle relative to the current vehicle;

determining a target area corresponding to the obstacle in the M areas according to an angle range to which the angle of the obstacle relative to the current vehicle belongs; and setting a hidden attribute of the target area to non-hidden, and setting hidden attributes of other M−1 areas in the M sectors to hidden, to display a warning sign corresponding to the target area, to indicate that the obstacle is located in a direction indicated by the angle range corresponding to the target area of the current vehicle; and causing a vehicle navigation system of the current vehicle to control a travel status of the current vehicle according to the warning sign.

18. The computer-readable storage medium according to claim 17, wherein the early warning region of the current vehicle comprises early warning regions of N warning levels, the early warning regions of the N warning levels being formed by enlarging an enclosed region of the current vehicle according to N different early warning distances; and the early warning region that the obstacle enters is an early warning region of an $i^{th}$ warning level in the N warning levels, N being a positive integer, and i being a positive integer less than or equal to N; and the setting a display attribute of the warning sign display region, to display a warning sign about the obstacle in the navigation interface comprises:

setting the display attribute of the warning sign display region according to the $i^{th}$ warning level, to display a warning sign corresponding to the $i^{th}$ warning level in the navigation interface, to indicate that a distance between the current vehicle and the obstacle is less than or equal to an $i^{th}$ early warning distance, different warning levels corresponding to warning signs with different colors.

* * * * *